United States Patent
Uchida et al.

(10) Patent No.: US 9,264,790 B2
(45) Date of Patent: *Feb. 16, 2016

(54) TRAY MOVING MECHANISM AND IN-VEHICLE AUDIO APPARATUS

(71) Applicant: SONY CORPORATION, Tokyo (JP)

(72) Inventors: Keiichiro Uchida, Saitama (JP); Hideki Ito, Tokyo (JP); Fuyuki Nakagome, Tokyo (JP)

(73) Assignee: SONY CORPORATION, Tokyo (JP)

( * ) Notice: Subject to any disclaimer, the term of this patent is extended or adjusted under 35 U.S.C. 154(b) by 419 days.

This patent is subject to a terminal disclaimer.

(21) Appl. No.: 13/713,959

(22) Filed: Dec. 13, 2012

(65) Prior Publication Data
US 2013/0101135 A1 Apr. 25, 2013

Related U.S. Application Data

(63) Continuation of application No. 12/947,220, filed on Nov. 16, 2010, now Pat. No. 8,792,651.

(30) Foreign Application Priority Data

Dec. 21, 2009 (JP) .................................. 2009-289599

(51) Int. Cl.
*H04B 1/00* (2006.01)
*H04R 1/02* (2006.01)
(Continued)

(52) U.S. Cl.
CPC *H04R 1/02* (2013.01); *B60R 11/02* (2013.01); *B60R 11/0211* (2013.01); *B60R 2011/0075* (2013.01); *B60R 2011/0087* (2013.01); *Y10T 74/18888* (2015.01)

(58) Field of Classification Search
CPC ........ H04R 2499/13; H04R 1/02; H04R 3/12; G10K 2210/1282
USPC .................................................... 381/86, 302
See application file for complete search history.

(56) References Cited

U.S. PATENT DOCUMENTS 4,679,106 A * 7/1987 Okita et al. ................ 360/99.06
5,610,376 A   3/1997 Takagi et al.
(Continued)

FOREIGN PATENT DOCUMENTS

CN    101115381 A    1/2008
DE    197 55 621 A1  6/1999
(Continued)

OTHER PUBLICATIONS

Combined Chinese Office Action and Search Report issued Jul. 30, 2014 in Patent Application No. 201010587623.5 with English Translation.

(Continued)

*Primary Examiner* — Alexander Jamal
(74) *Attorney, Agent, or Firm* — Oblon, McClelland, Maier & Neustadt, L.L.P.

(57) ABSTRACT

A tray moving mechanism includes: a unit base having an internal space formed as a containing space; and a tray movable between a retracted position in which the unit base is contained in the containing space and a projected position in which a music player formed in a substantially rectangular shape can be placed on the tray and in which a part of the tray is projected from the base unit, wherein the tray is moved with respect to the unit base such that the orientations of the tray with respect to the unit base in the retracted and projected positions are substantially 90 deg different from each other.

5 Claims, 23 Drawing Sheets

(51) Int. Cl.
    *B60R 11/02*     (2006.01)
    *B60R 11/00*     (2006.01)

(56) References Cited

U.S. PATENT DOCUMENTS

| | | | |
|---|---|---|---|
| 5,953,307 A * | 9/1999 | Nakanishi et al. | 720/615 |
| 5,974,333 A | 10/1999 | Chen | |
| 6,250,527 B1 * | 6/2001 | Mizue et al. | 224/281 |
| 2006/0277555 A1 | 12/2006 | Howard et al. | |
| 2007/0087725 A1 * | 4/2007 | Anderson | 455/348 |
| 2008/0025526 A1 | 1/2008 | Iwade | |
| 2008/0174136 A1 | 7/2008 | Welschholz et al. | |

FOREIGN PATENT DOCUMENTS

| | | |
|---|---|---|
| DE | 10 2006 008 420 A1 | 8/2007 |
| DE | 10 2007 034 764 A1 | 1/2008 |
| GB | 2 287 501 A1 | 9/1995 |
| JP | 2-206059 A | 8/1990 |
| JP | 4-132650 U | 12/1992 |
| JP | 8-83483 A | 3/1996 |
| JP | 2000-113656 A | 4/2000 |
| JP | 2000-332433 | 11/2000 |
| JP | 2002-42455 A | 2/2002 |
| JP | 2003-85857 A | 3/2003 |
| JP | 2008-24259 | 2/2008 |
| JP | 2009-179097 | 8/2009 |
| JP | 2009-262891 A | 11/2009 |
| WO | WO 2006/065572 A2 | 6/2006 |

OTHER PUBLICATIONS

Japanese Office Action issued Oct. 8, 2013 in Patent Application No. 2009-289599 with English Translation.

Combined Chinese Office Action and Search Report issued Aug. 20, 2014 in Patent Application No. 201310014358.5 (with English Translation).

Extended Search Report issued Apr. 19, 2011 in Europe Application No. 10190588.3.

* cited by examiner

TRAY MOVING MECHANISM AND IN-VEHICLE AUDIO APPARATUS

CROSS REFERENCE

This application is a continuation of and is based upon and claims the benefit of priority under 35 U.S.C. §120 for U.S. Ser. No. 12/947,220, filed Nov. 16, 2010, and claims the benefit of priority under 35 U.S.C. §119 from Japanese Patent Application No. 2009-289599, filed Dec. 21, 2009, the entire contents of each of which are incorporated herein by reference.

BACKGROUND OF THE INVENTION

1. Field of the Invention

The present invention relates to the field of techniques associated with tray moving mechanisms and in-vehicle audio apparatus. More specifically, the invention relates to a technique for setting the direction of a tray which is moved relative to a unit base such that the tray is set in orientations substantially 90 deg different from each other in a projected position and a retracted position, the technique allowing the apparatus having the tray to be made compact through efficient utilization of space.

2. Description of the Related Art

Some in-vehicle audio apparatus allows a portable music player formed in a planar and substantially rectangular shape to be contained therein and allows the music player to be operated from outside to reproduce music recorded in the same and to output the music from a speaker provided in a vehicle (for example, see JP-A-2008-24259 and JP-A-2009-179097 (Patent Documents 1 and 2)).

Such an in-vehicle audio apparatus includes a tray moving mechanism having a unit base and a tray which can be moved relative to the unit base between a retracted position and a projected position.

A music player is contained in the in-vehicle audio apparatus by placing the music player on the tray in the projected position and urging the tray rearward to move it to the retracted position. The music player is removed from the tray by pulling out the tray from the retracted position to the projected position.

SUMMARY OF THE INVENTION

In the in-vehicle audio apparatus disclosed in Patent Document 1, a tray is moved between a retracted position and a projected position by linearly operating the tray back and forth, and an operating section including a power switch is provided at the front end of the apparatus beside the space in which the tray is moved.

Thus, a space behind the operating section is not used as the tray moving space. Therefore, the space inside the apparatus is not efficiently used, which hinders the apparatus from being made compact. Especially, in the case of an apparatus configured to accommodate an elongated music player placed on a tray, the configuration makes it necessary to provide the apparatus with a great dimension in the depth direction (front-rear direction) thereof.

In the in-vehicle audio apparatus disclosed in Patent Document 2, a tray is moved between a retracted position and a projected position by rotating the tray about a shaft serving as a fulcrum provided at a front end of a unit base. In the projected position, the tray is entirely projected from the unit base. When the tray is projected from the unit base as thus described, the tray projects from the unit base in front of the apparatus in a great mount of projection, which also constitutes a hindrance to the reduction of the size of the apparatus.

Since the tray is entirely projected from the unit base in front of the apparatus, the total weight of the tray and a music player placed on the tray must be born only by the shaft provided at the front end of the unit base, which can make the tray unstable in the projected position.

Under the circumstance, it is desirable to provide a tray moving mechanism and an in-vehicle audio apparatus in which the above-described problem can be solved to allow efficient utilization of spaces and to achieve compactness.

According to an embodiment of the invention, there is provided a tray moving mechanism including a unit base having an internal space formed as a containing space, and a tray movable between a retracted position in which the unit base is contained in the containing space and a projected position in which a music player formed in a substantially rectangular shape can be placed on the tray and in which a part of the tray is projected from the base unit. The tray is moved with respect to the unit base such that the orientations of the tray with respect to the unit base in the retracted and projected positions are substantially 90 deg different from each other.

The orientations of the tray with respect to the unit base in the retracted and projected positions are substantially 90 deg different from each other. Therefore, the orientation in which the music player is set when the tray is in the projected position is 90 deg different from the orientation in which the music player is set when the tray is in the retracted position. Thus, spaces can be effectively utilized to achieve compactness.

Since only a part of the tray is projected from the unit base in the projected position, the tray has high stability in the projected position.

In the above-described tray moving mechanism, a first guide portion and a second guide portion may be provided on either the unit base or the tray. A first guided portion slidably supported by the first guide portion and a second guided portion slidably supported by the second guide portion may be provided on either the unit base or the tray. The first guide portion or the first guided portion may be formed in a straight shape. The second guide portion or the second guided portion may be formed in a curved shape. The first guided portion and the second guided portion may be guided by the first guide portion and the second guide portion, respectively, to move the tray between the projected position and the retracted position.

The first guide portion or the first guided portion may be formed in a straight shape, and the second guide portion or the second guided portion may be formed in a curved shape. Thus, the tray is moved in a trajectory including both of curved and straight trajectories. Thus, the trajectory of the movement of the tray can be designed as desired according to the shapes and positions of other members such as the unit base. Thus, the space efficiency can be optimized and whereby the mechanism can further be compacted.

In the above-described tray moving mechanism, the music player may be placed on the tray such that it is elongated in the front-rear direction of the tray when the tray is in the projected position.

The music player is placed on the tray such that it is elongated in the front-rear direction of the tray when the tray is in the projected position. Thus, a space can be easily formed beside the tray when the tray is in the projected position. Required components can be disposed beside the tray while suppressing any increase in the size of the apparatus.

The above-described tray moving mechanism may be provided with a gear plate rotatably supported on the tray, a reduction gear rotatably supported on the gear plate for reducing the speed of movement of the tray, and a rack formed on the unit base and engageable with the reduction gear. The reduction gear may engage the rack when the tray is moved from the retracted position toward the projected position. The reduction gear may be disengaged from the rack when the tray is moved from the projected position toward the retracted position.

The reduction gear engages the rack when the tray is moved from the retracted position toward the projected position, and the reduction gear is disengaged from the rack when the tray is moved from the projected position toward the retracted position. Thus, a load is imparted from the reduction gear to the tray when the tray is moved from the retracted position toward the projected position, and no load is imparted from the reduction gear to the tray when the tray is moved from the retracted position toward the projected position.

Therefore, the tray can be moved at a low speed from the retracted position toward the projected position, and the tray can be moved from the projected position toward the retracted position with no load imparted from the reduction gear.

In the above-described tray moving mechanism, the gear plate may have an operating projection which slides on the unit base when the tray is moved. A rotational force in the direction of moving the reduction gear apart from the rack may be imparted to the gear plate by a frictional force generated between the operating projection and the unit base when the tray is moved from the projected position toward the retracted position.

When the tray is moved from the projected position toward the retracted position, the frictional force generated between the operating projection and the unit base imparts a rotational force to the gear plate in the direction of moving the reduction gear away from the rack. The reduction gear is moved away from the rack by the rotational force thus imparted.

The reduction gear can be engaged and disengaged with and from the rack using a simple mechanism. Therefore, the tray can be moved at a controlled speed with a reduced load using a simple mechanism.

The above-described tray moving mechanism may include a locking lever locking the tray in the retracted position, and an urging spring imparting a force to the tray to move it from the retracted position toward the projected position. The tray may be moved from the retracted position to the projected position by the urging force of the urging spring when the tray is unlocked or released from the locking lever in the retracted position.

When the tray is unlocked or released from the locking lever in the retracted position, the tray is moved by the urging force of the urging spring from the retracted position to the projected position, thus, the urging force of the urging spring is imparted to the tray when moving from the retracted position to the projected position.

Thus, the mechanism can be made simple.

According to another embodiment of the invention, there is provided an in-vehicle audio apparatus including a housing having an opening at least on one side thereof, a unit base disposed in the housing and having an internal space formed as a containing space, and a tray movable between a retracted position in which the unit base is contained in the containing space and a projected position in which a music player formed in a substantially rectangular shape can be placed on the tray and in which a part of the tray is projected from the base unit.

The tray is moved with respect to the unit base such that the orientations of the tray with respect to the unit base in the retracted and projected positions are substantially 90 deg different from each other.

The orientations of the tray with respect to the unit base in the retracted and projected positions are substantially 90 deg different from each other. Therefore, the orientation in which the music player is set when the tray is in the projected position is 90 deg different from the orientation in which the music player is set when the tray is in the retracted position. Thus, spaces can be efficiently utilized to achieve compactness.

Since only a part of the tray is projected from the unit base in the projected position, the tray has high stability in the projected position.

In the above-described in-vehicle audio apparatus, a first guide portion and a second guide portion may be provided on either the unit base or the tray. A first guided portion slidably supported by the first guide portion and a second guided portion slidably supported by the second guide portion may be provided on either the unit base or the tray. The first guide portion or the first guided portion may be formed in a straight shape. The second guide portion or the second guided portion may be formed in a curved shape. The first guided portion and the second guided portion may be guided by the first guide portion and the second guide portion, respectively, to move the tray between the projected position and the retracted position.

The first guide portion or the first guided portion may be formed in a straight shape, and the second guide portion or the second guided portion may be formed in a curved shape. Thus, the tray is moved in a trajectory including both of curved and straight trajectories. The trajectory of the movement of the tray can be designed as desired according to the shapes and positions of other members such as the unit base, and higher compactness can therefore be achieved through optimization of space efficiency.

The above-described in-vehicle audio apparatus may include a front panel rotatably supported on the housing for exposing and closing the opening of the housing, a connector section having a connection terminal, provided inside the housing and in a position on a side of the housing, and a terminal portion connected to the connection terminal of the connector section when the opening of the housing is closed by the front panel. The music player may be placed on the tray in the projected position and located beside the connector section such that the music player is elongated in the front-rear direction of the apparatus.

The music player is placed on the tray such that it is elongated in the front-rear direction of the tray when the tray is in the projected position. Thus, a space can be easily formed beside the tray when the tray is in the projected position, and the connector section can be disposed beside the tray while suppressing any increase in the size of the apparatus.

In the above-described in-vehicle audio apparatus, the music player placed on the tray may be contained behind the connector section in the retracted position such that it is elongated in the transverse direction of the apparatus, when the tray is in the retracted position.

Since the music player is contained behind the connector section such that it is elongated in the transverse direction of the apparatus, when the tray is in the retracted position, the length of the in-vehicle audio apparatus in the front-rear direction thereof can be kept small.

DESCRIPTION OF THE PREFERRED EMBODIMENTS

Embodiments of the invention will now be described with reference to the drawings.

For example, an in-vehicle audio apparatus according to an embodiment of the invention is provided in a recess formed on a front cabinet in a vehicle.

For the sake of convenience, in the following description, the side of the apparatus facing the driver of the vehicle will be referred to as "front side", and the side of the apparatus facing the front cabinet will be referred to as "rear side".

The following definition of upward, downward, frontward, rearward, leftward, and rightward directions is given only for the sake of convenience, and applications of the invention are not limited to the definition of directions.

<Configuration of In-Vehicle Audio Apparatus>

Figure 1:
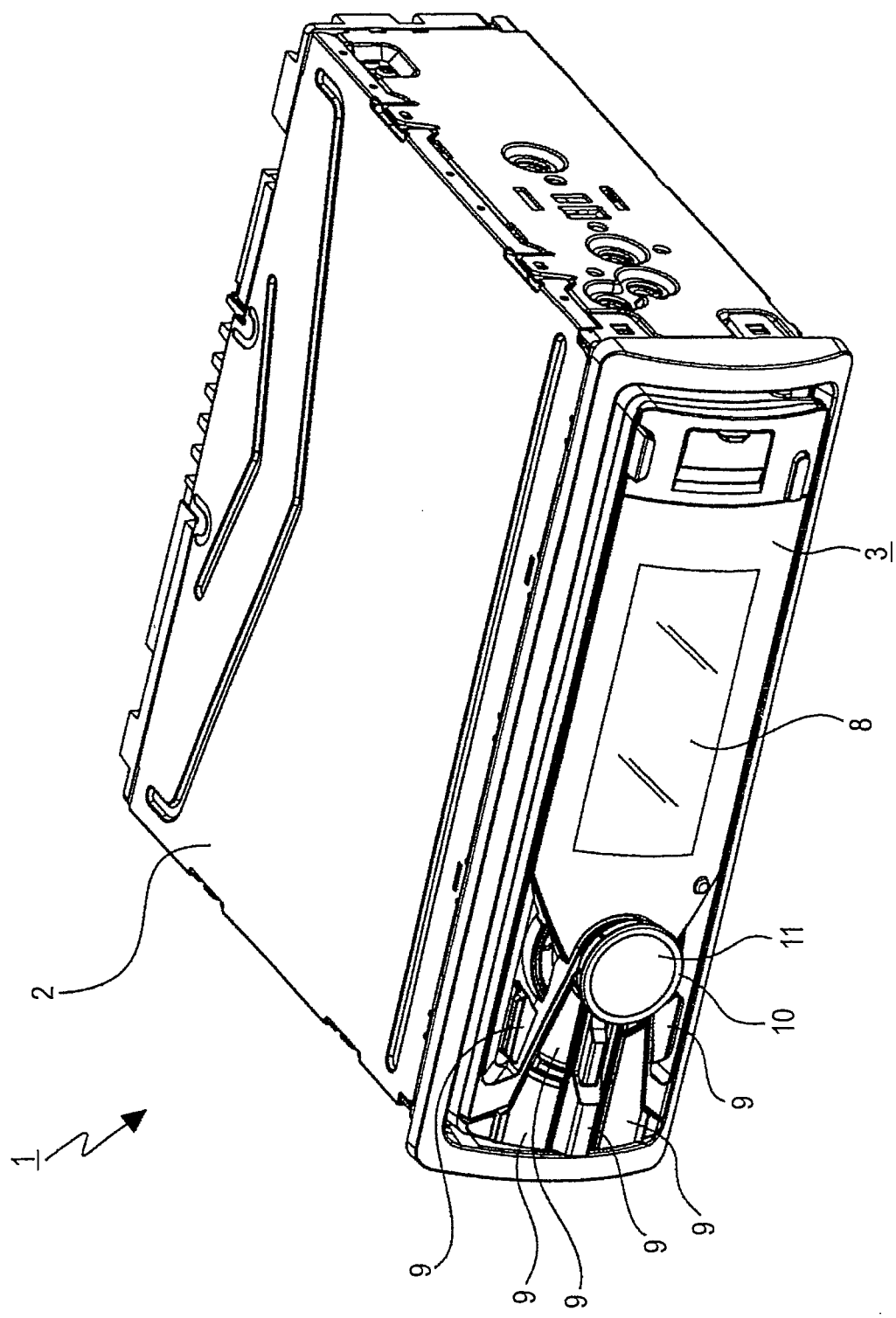
FIG. 1 is a perspective view of an in-vehicle audio apparatus according to an embodiment of the invention showing a state thereof in which a front panel is in a closed state.
Figure 2:
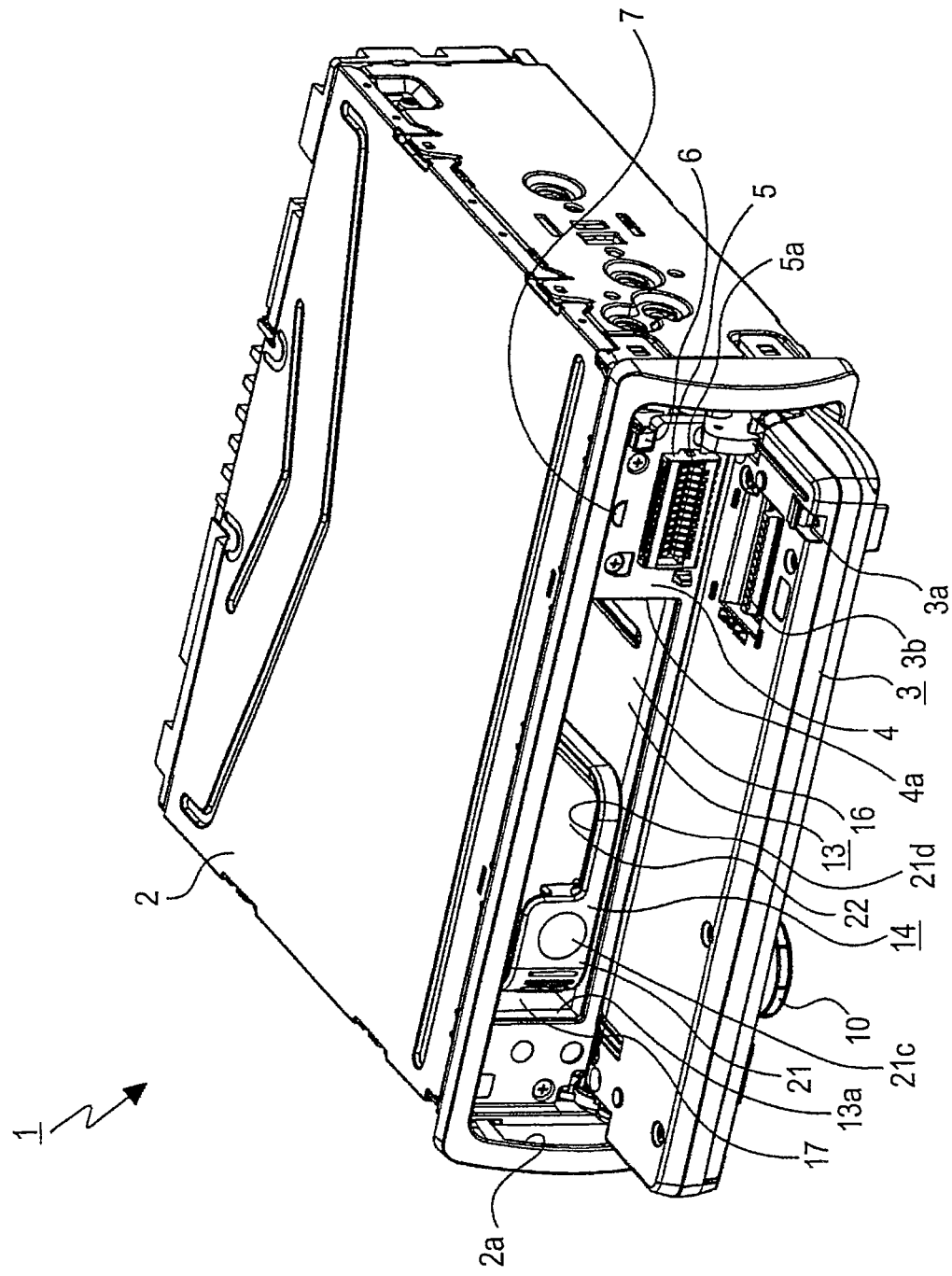
FIG. 2 is a perspective view of the in-vehicle audio apparatus showing a state thereof in which the front panel is in an open position and a tray is in a retracted position.

As shown in FIGS. 1 and 2, an in-vehicle audio apparatus 1 includes a housing 2, a front panel 3 openably supported at a front end of the housing 2, and other required elements disposed inside the housing 2. The housing 2 has an opening 2a at a front end thereof.

An internal panel 4 is disposed in a position in the housing 2 near the front end of the same. A connector section 5 is provided at a left end of the internal panel 4, and connection terminals 5a are provided at the connector section 5. The region in the housing 2 located behind the connector section 5 is an open space.

The internal panel 4 is formed with an oblong opening 4a to accept a tray beside the connector section 5. A locking piece 6 is provided at a top end of the left end portion of the internal panel 4. A light-emitting section 7 such as a light-emitting diode is disposed on the internal panel 4 above the connection terminals 5a.

The front panel 3 is formed in an oblong and substantially rectangular shape and supported at a bottom end of the front end part of the housing 2 such that it can be rotated about a bottom end thereof which serves as a fulcrum. A locking recess 3a is formed at a left end of an inner surface of the front panel 3. A terminal portion 3b is provided at the left end of the front panel 3.

The front panel 3 is locked in a close position (see FIG. 1) to close the opening 2a of the housing 2 by engaging the locking piece 6 with the locking recess 3a. When the front panel 3 in the closed position is manually urged rearward, the front panel is unlocked and released from the housing 2 and rotated by an urging force of a spring member (not shown) frontward to reach an open position, whereby the opening 2a of the housing 2 is exposed (see FIG. 2). The front panel 2 is manually rotated from the open position to return to the close position in which the panel is locked to the housing 2 to close the opening 2a of the housing (see FIG. 1).

When the front panel 3 reaches the close position, the terminal portion 3b is connected to the connection terminals 5a of the internal panel 4.

A display section 8 is provided on an outer face (front face) of the front panel 3. Predetermined matters such as the present state of driving are displayed on the display section 8. Operating parts 9, a light-emitting section 10, and an audio output section 11 are disposed on the front face of the front panel 3.

A music player 100 is contained in the in-vehicle audio apparatus 1. The in-vehicle audio apparatus 1 can reproduce pieces of music recorded in the music player 100 and output the music from a speaker or the like provided in the vehicle.

Pieces of music recorded in the music player 100 can be reproduced by operating the operating parts 9 disposed on the front panel 3 or controlling the player using a remote controller (not shown) from outside.

When the engine of the vehicle is stopped with the music player 100 contained in the in-vehicle audio apparatus 1, light is emitted from the light-emitting section 10 as alarm light, sounds are output from the audio output section 11 as alarm sounds. Because alarm light is emitted and alarm sounds are output as thus described, it is possible to prevent the music player 100 from being left unremoved in the in-vehicle audio apparatus 1.

When the front panel 3 is rotated to the open position with the music player 100 contained in the in-vehicle audio apparatus 1, the light-emitting section 7 provided in the internal panel 4 blinks. The blinking of the light-emitting section 7 also makes it possible to prevent the music player 100 from being left unremoved in the in-vehicle audio apparatus 1.

Figure 3:
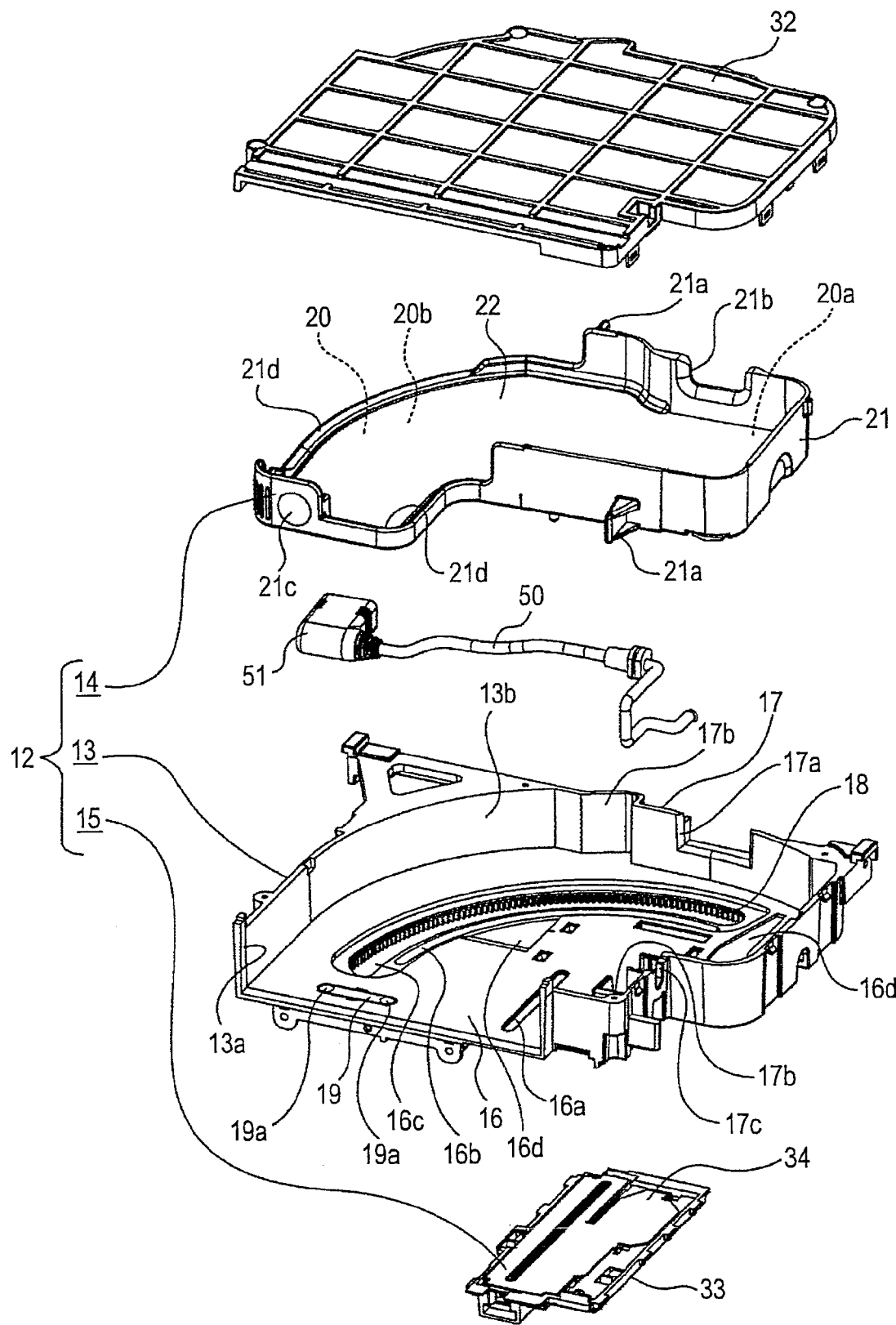
FIG. 3 is an exploded perspective view of a tray moving mechanism.

A tray moving mechanism 12 is disposed in the housing 2 (see FIG. 3). The tray moving mechanism 12 includes a unit base 13, a tray 14, and a driving unit 15.

The unit base 13 has a bottom section 16 and a peripheral wall section 17 protruding upward from the periphery of the bottom section 16 excluding a front end portion of the section, and the top and front sides of the unit base are open. The unit base 13 is secured inside the housing 2.

The opening at the front end of the unit base 13 is formed as a tray insertion/removal port 13a, and the space inside the unit base 13 is formed as a containing space 13b.

A first guide portion 16a extending in the front-rear direction is formed on the bottom section 16 in a position close to the front end of the bottom section. The first guide portion 16a is in the form of a hole penetrating the bottom section across top and bottom surfaces thereof. A second guide portion 16b having a substantially arcuate shape is formed to extend from a position near a right end of the bottom section 16 to a position near a rear end of the bottom section 16. The second guide portion 16b is in the form of an upwardly open groove.

A gear insertion groove 16c having a substantially arcuate shape is formed to extend along the outline of the second guide portion 16b. The gear insertion groove 16c opens upward and, and a rack 18 is formed on a sidewall which defines the gear insertion groove 16c.

Moisture reservoir portions 16d in the form of upward open shallow recesses are formed on the bottom section 16 at the front end of the same. The moisture reservoir portions 16d have the function of holding moisture therein just in case moisture enters through the opening 2a of the housing 2, whereby the moisture is prevented from entering and being deposited in other regions in the housing.

A sliding member 19 is mounted on the bottom section 16. The sliding member 19 is formed from a material which is different from the material of the unit base 13 and which high slidability. For example, the material may be polyacetate. The sliding member 19 includes sliding projections 19a in the form of upward projections having an arcuate surface which are spaced from each other in the left-right direction of the bottom section. Top ends of the sliding projections 19a are in positions slightly higher than the top surface of the bottom section 16.

A ventilation cutout 17a is formed at the rear end of the peripheral wall section 17 of the unit base 13. A fan is provided at the rear end of the housing 2 to deliver cooling wind to the containing space 13b through the ventilation cutout 17a.

The peripheral wall section 17 has an insertion recess 17b, which is a laterally open recess, formed at each of the front and rear ends of the wall section.

The peripheral wall section 17 has a cable supporting recess 17c, which is an upwardly open recess, formed in a position near the insertion recess 17b on the front side of the wall section.

Figure 4:
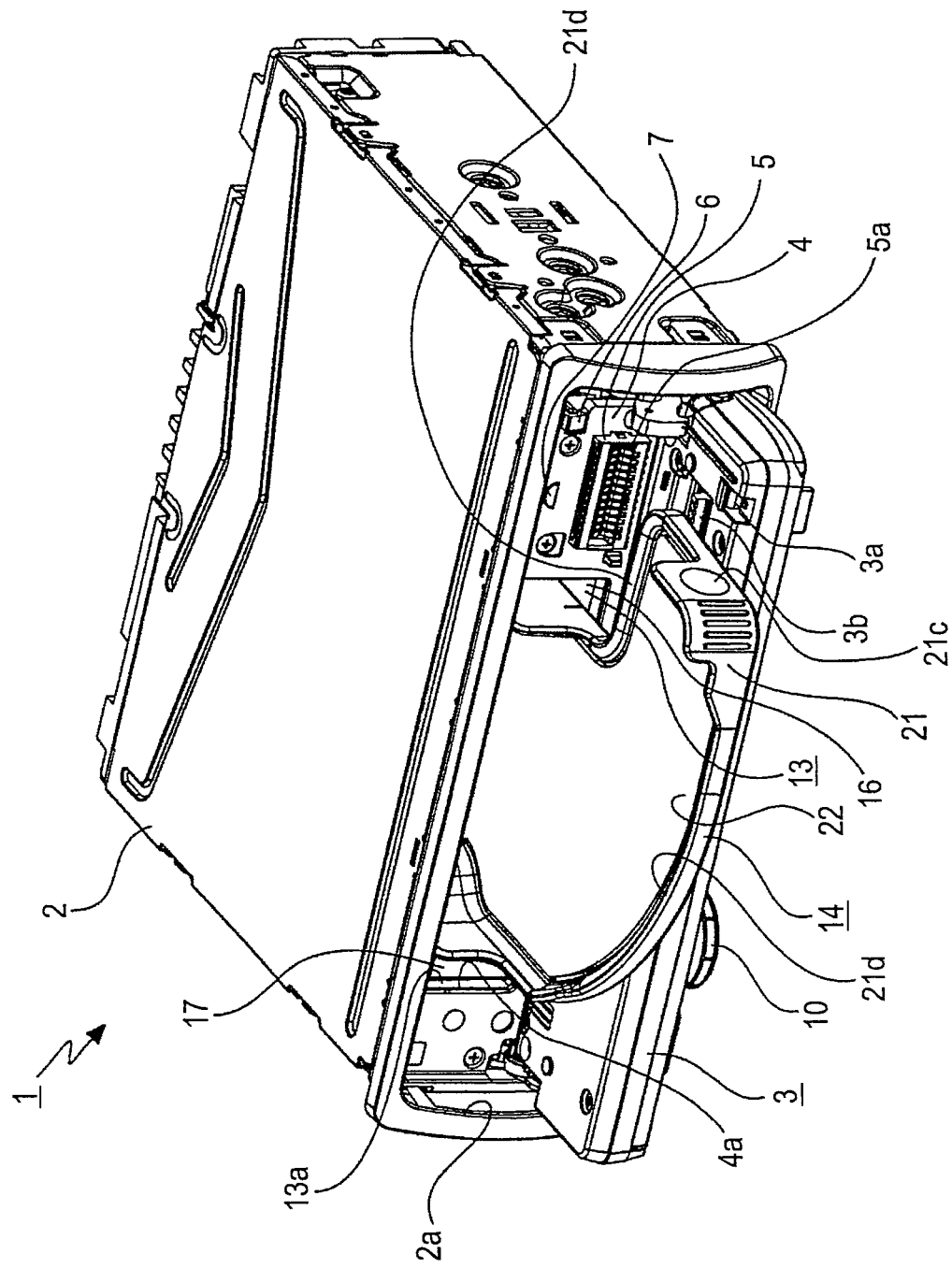
FIG. 4 is a perspective view of the in-vehicle audio apparatus showing a state thereof in which the front panel is in the open position and the tray is in a projected position.

The tray 14 is movably supported on the unit base 13, and the tray is moved between a retracted position (see FIG. 2) in which the tray is contained in the containing space 13b of the unit base 13 and a projected position (see FIG. 4) in which the tray is partially projected frontward from the unit base 13 to allow the music player 100 to be placed thereon.

Figure 5:
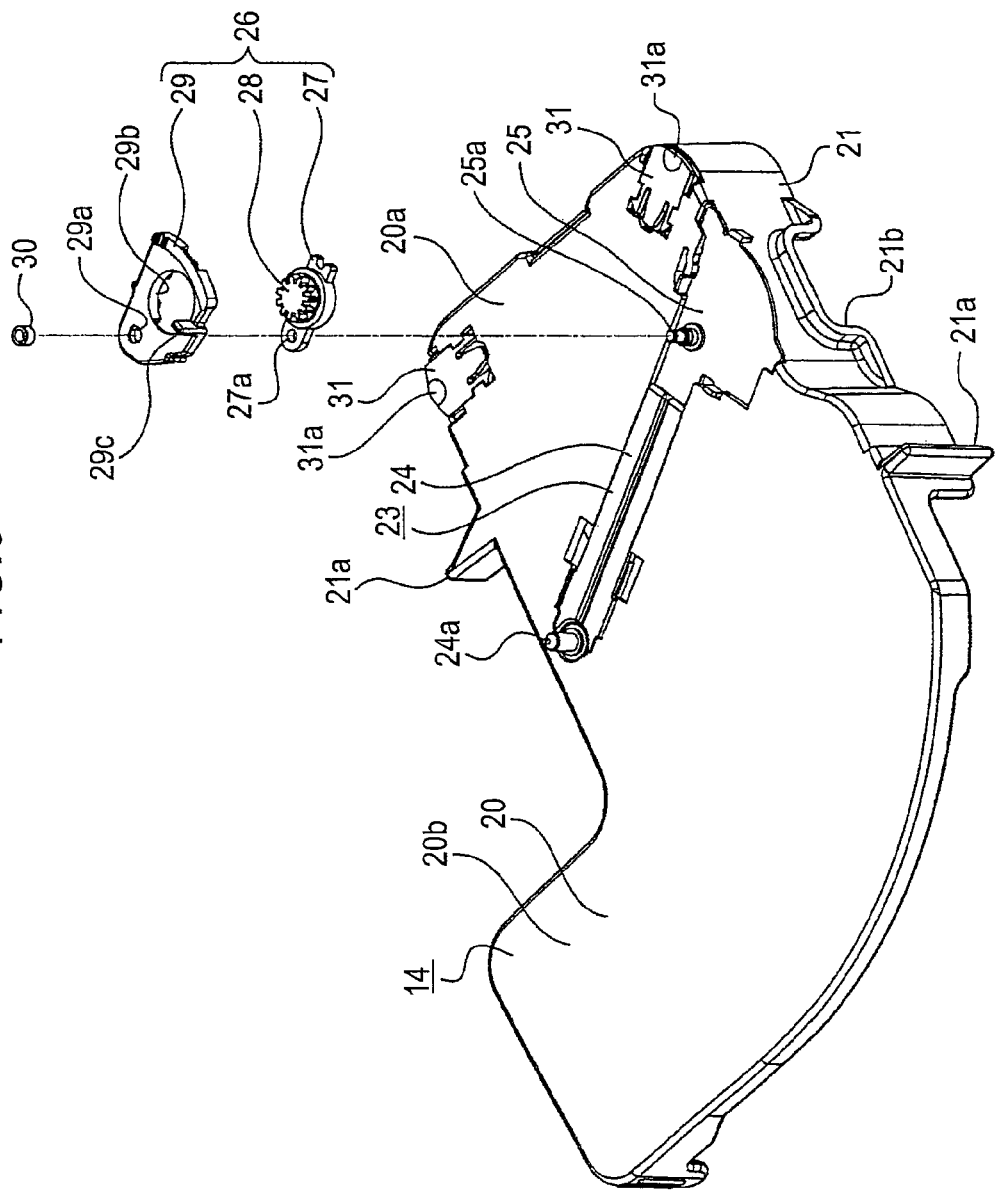
FIG. 5 is an exploded perspective view of a tray, a shaft/plate, and a gear unit.

The tray 14 includes a bottom wall 20 and a peripheral wall 21 projecting upward from the periphery of the bottom wall 20, and the tray is therefore upwardly open (see FIGS. 3 and 5). The tray 14 is supported on the unit base 13 such that it can be moved in predetermined directions.

The bottom wall 20 is formed by a rectangular portion 20a which is formed in a substantially rectangular shape and a bend portion 20b which contiguously extends from one longitudinal end of the rectangular portion 20a. The bend portion 20b extends substantially perpendicularly to the rectangular portion 20a, whereby a bend is formed between those portions.

The peripheral wall 21 has anti-dust projections 21a projecting outward from an outer surface thereof, and the anti-dust projections 21a project in directions opposite to each other. The anti-dust projections 21a have the function of preventing dust from entering the containing space 13b of the base unit 13.

The peripheral wall 21 is formed with an upwardly open cutout 21b. The cooling air supplied by the fan to the containing space 13b through the ventilation cutout 17a of the unit base 13 is passed through the cutout 21b.

The peripheral wall 21 has an urged portion 21c which is the part of the peripheral wall which constitutes the front end of the wall when the rectangular portion 20a of the bottom wall 20 extends such that it is elongated in the transverse direction of the housing. The peripheral wall 21 has upwardly open mounting/removal cutouts 21d formed on both sides of the urged portion 21c. The mounting/removal cutouts 21d formed on the peripheral wall 21 allow the music player 100 to be easily mounted and removed on and from the tray 14.

A cushion 22 is provided on the top surface of the bottom section 20 of the tray 14.

Figure 6:
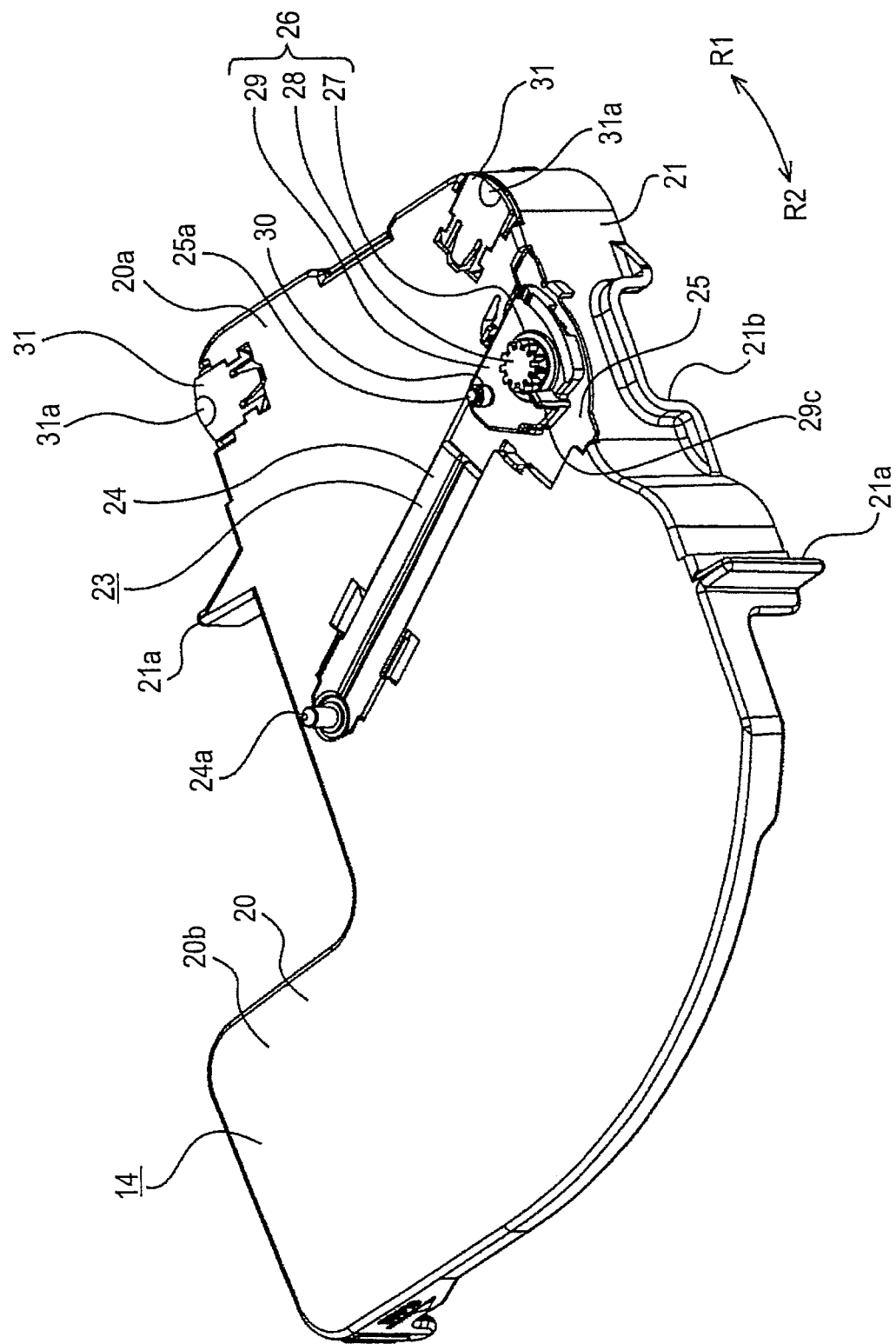
FIG. 6 is a perspective view of the gear unit in an unengaged position, showing the gear unit along with the tray and the shaft/plate.
Figure 7:
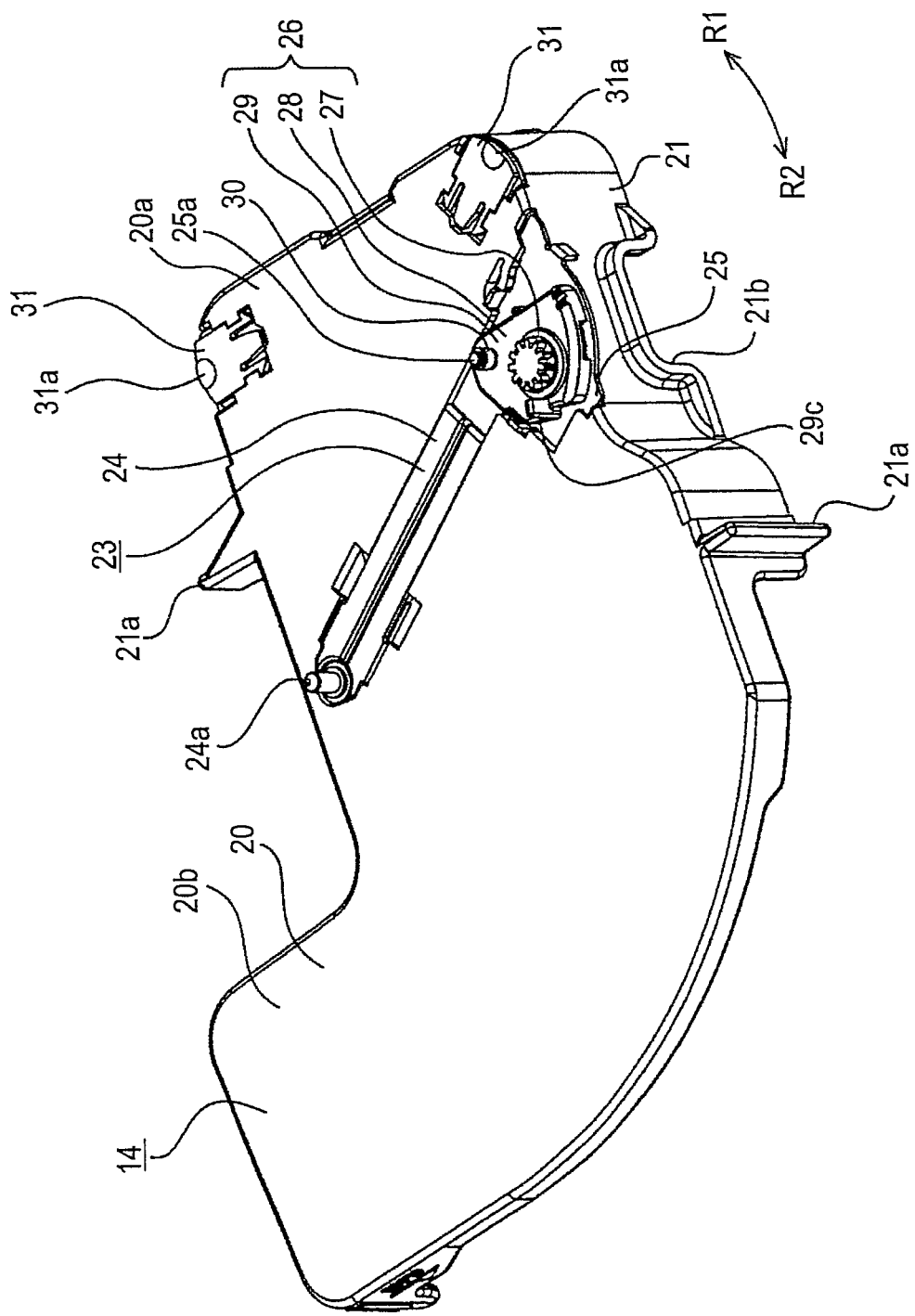
FIG. 7 is a perspective view of the gear unit in an engaged position, showing the gear unit along with the tray and the shaft/plate.

A shaft/plate 23 is attached to a bottom surface of the bottom wall 20 (see FIGS. 5 to 7). The shaft/plate 23 is formed by a shaft portion 24 which linearly extends and a plate portion 25 which is contiguous with one longitudinal end of the shaft portion 24.

A first guided portion 24a in the form of a shaft is provided so as to project downward from another end of the shaft portion 24.

A second guided portion 25a in the form of a shaft is provided so as to project downward from the plate portion 25.

A gear unit 26 is rotatably supported on the plate portion 25 of the shaft/plate 23. The gear unit 26 is formed by a bear base 27, a reduction gear 28, and a mounting plate 29.

The gear base 27 has a shaft insertion hole 27a which is formed to extends through the gear base in the vertical direction.

The reduction gear 28 is supported rotatably on a bottom surface of the gear base 27. For example, the reduction gear 28 rotates at a low speed because it receives certain resistance of a fluid enclosed in the gear base 27.

The gear plate 29 is formed with a shaft insertion hole 29a and a gear insertion hole 29b which penetrate through the gear plate in the vertical direction. The gear base 27 is attached to the gear plate 29 with the reduction gear 28 inserted through the gear insertion hole 29b located above the same. The gear plate 29 has an operating projection 29c projecting downward.

The gear unit 26 is rotatably supported on the plate portion 25 with the second guided portion 25a of the shaft plate 23 inserted through the shaft insertion hole 27a of the gear base 27 and the shaft insertion hole 29a of the gear plate 29 located above the same. When the gear unit 26 is supported on the plate portion 25 as thus described, a bottom end of the second guided portion 25a projects downward, a roller 30 is rotatably supported around the projecting part.

The gear unit 26 can be rotated with respect to the shaft plate 23 about the second guided portion 25a serving as a fulcrum between an engaging position in which the reduction gear 28 can be engaged with the rack 18 (see FIG. 6) and a disengaging position in which the reduction gear 28 is apart from the rack 28 (see FIG. 7).

Sliders 31 are mounted on a bottom surface of the tray 14 in positions apart from each other at one end of the bottom wall 20. For example, the sliders 31 are formed from a material having high slidability different from the that of the tray 14, e.g., polyacetal. The sliders 31 have respective sliding projections 31a formed as downward projections having an arcutate surface. Bottom ends of the sliding projections 31a are located slightly lower than the bottom surface of the bottom section 20.

The tray 14 is rotatably supported o the unit base 13 with the first guided portion 24a inserted through the first guide portion 16a and the second guided portion 25a and the roller 30 inserted through the second guide portion 16b. The first guided portion 24a projects downward from the unit base 13. The tray 14 is engaged with the rack 18 with the reduction gear 28 inserted through the gear insertion groove 16c of the unit base 13. Therefore, the first guided portion 24a is guided to the first guide portion 16a, and the second guided portion 25a and the roller 30 are guided to the second guide portion 16b. Thus, the reduction gear 28 is rotated and advanced along the rack 18, whereby the gear can be moved with respect to the unit base 13.

Since the roller 30 is inserted in the second guide portion 16b of the unit base 13 to be guided by the same, the tray 14 can be smoothly moved with respect to the unit base 13.

In the above-described example, the first guide portion 16a and the second guide portion 16b are guide grooves or guide holes, and the first guided portion 24a and the second guided portion 25a are guided shafts. Alternatively, the first and second guide portions may be guide shafts, and the first and second guided portions may be guided grooves or guided holes.

A cover 32 is mounted on the unit base 13 from above the same with the tray 14 supported on the unit base 13 as described above, whereby the containing space 13b is closed from above (see FIG. 3).

Figure 8:
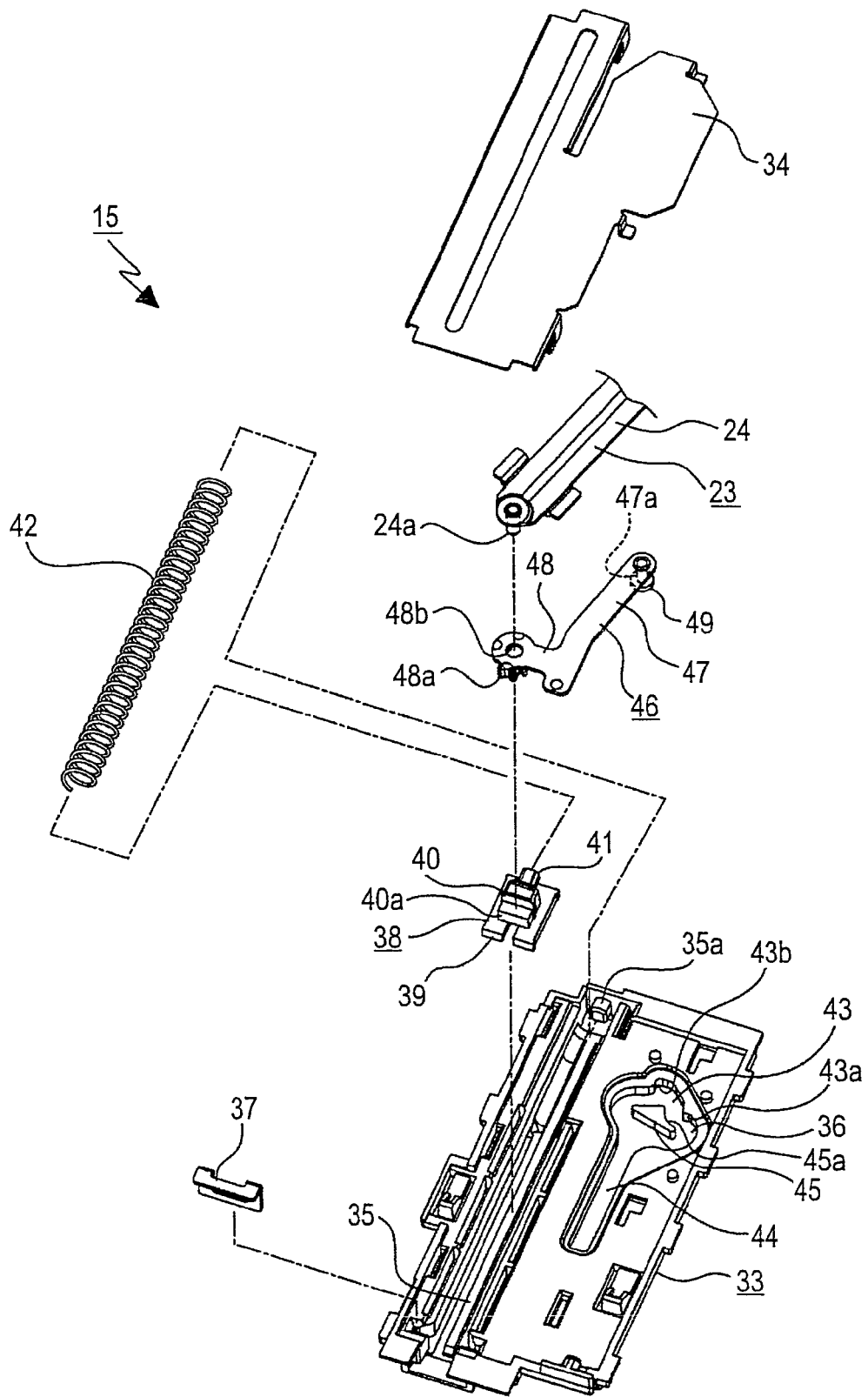
FIG. 8 is an exploded perspective view of a driving unit and a part of the shaft/plate.

The driving unit 15 is provided under the bottom of the unit base 13 and mounted on the bottom of the housing 2. The driving unit 15 is supported on a support base 22 in locations where support is required, and a cover plate 34 is mounted on the support base (see FIG. 8).

The support base 33 is formed in a substantially rectangular shape facing upward and downward. The support base has a support groove 35 extending in the front-rear direction in a position near the light end thereof and a cam groove 36 near the left end thereof.

A spring support projection 35a protecting frontward is provided at a rear end of the support groove 35. A stopper 37 is mounted at a front end of the support groove 35.

A slider 38 is movably supported in the support grove 35. The slider 38 is provided by integrally forming a supported portion 39 which is supported in the support groove 35, a connecting portion 40 which upwardly projects from the supported portion 39, and a spring support projection 41 which projects rearward from the connecting portion 40. A stepped surface 40a facing frontward is formed on the connecting portion 40.

An urging spring 42 is supported between the spring support portion 41 and the spring support projection 35a provided in the support groove 35 with the slider 38 supported in the support groove 35, and the urging spring 42 is disposed in the support groove 35. For example, a compression coil spring is used as the urging spring 42. Therefore, the slider 38 is urged frontward by the urging spring 42.

The cam groove 36 includes an annular portion 43 and a straight portion 44 extending in the front-rear direction which are continuously formed. A first regulating recess 43a and a second regulating recess 43b which open frontward are formed at a rear end of the annular portion 43, the recesses being apart from each other in the left-right direction. The straight portion 44 is contiguous with a front end of the annular portion 43.

A cam engaging portion 45 formed in a substantially triangular shape is provided in the middle of the annular portion 43 of the support base 33. The cam engaging portion 45 has a rearwardly open locking recess 45a which is formed in a position opposite to the first regulating recess 43a.

A locking lever 46 is connected with the slider 38. The locking lever 46 is formed by an arm portion 47 which is substantially L-shaped and which extends substantially in the front-rear direction and a connecting projection 48 which laterally projects from a position of the arm portion 47 near a front end thereof.

The arm portion 47 has a downwardly projecting cam pin 47a provided at a rear end thereof. A roller 49 is supported around the cam pin 47a.

A connecting piece 48a is provided at a tip region of the connecting projection 48 such that it downwardly projects from a front edge of the connecting projection. A support hole 48b is formed at the tip region of the connecting projection 48 such that it extends across top and bottom surfaces of the tip region.

The roller 49 supported by the cam pin 47a of the locking lever 46 is slidably (rotatably) supported in the cam groove 36.

Since the roller 49 is inserted and slid in the cam groove 36 of the support base 33, the locking lever 46 can be smoothly moved with respect to the support base 33.

Figure 9:
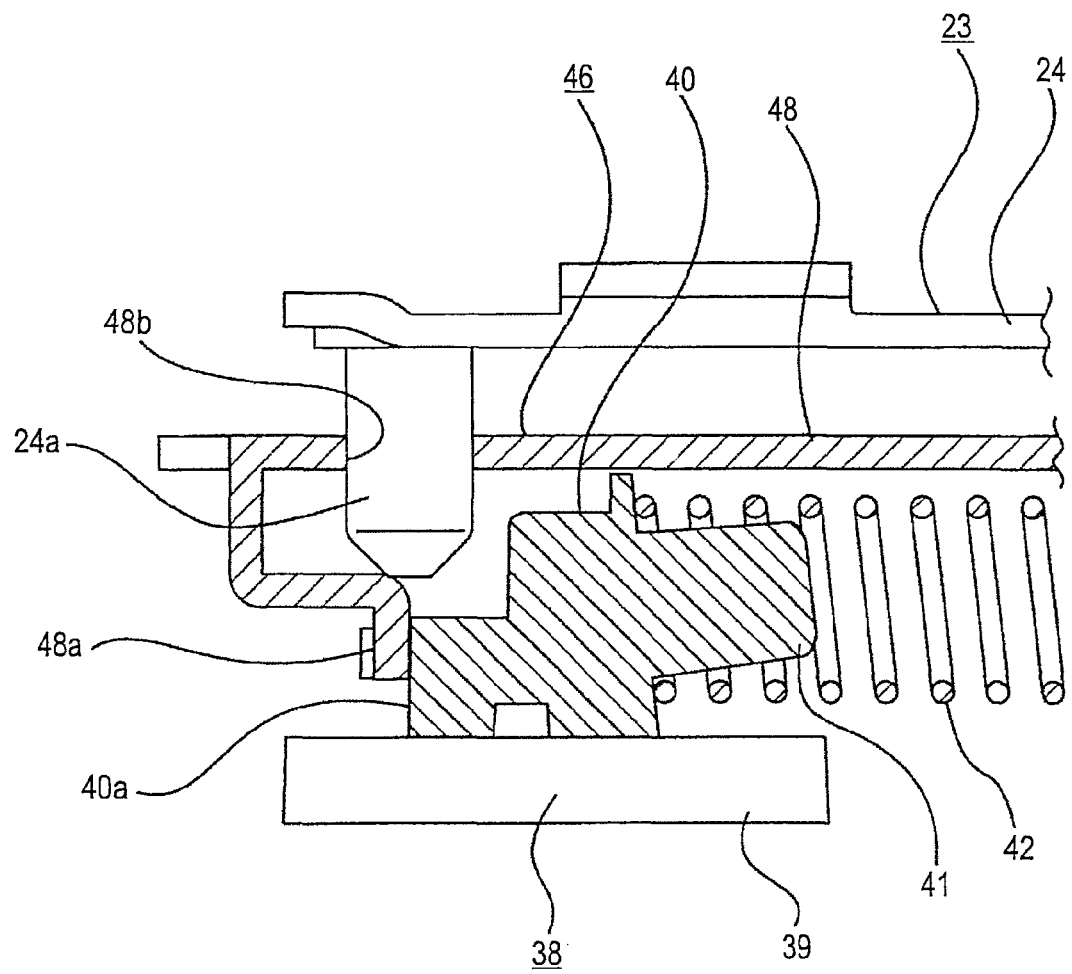
FIG. 9 is a enlarged sectional view of a locking lever connected with a slider.

The connecting piece 48a of the locking lever 46 is engaged with the stepped portion 40a from the front side thereof, whereby locking lever is connected to the slider 38 (see FIG. 9). Therefore, un urging force is imparted to the locking lever 46 by the urging spring 42 through the slider 38.

The first guided portion 24a of the shaft/plate 23 attached to the tray 14 is inserted from above and supported in the support hole 48b of the locking lever 46. Thus, the tray 14 is connected to the locking lever 46 such that it can be rotated about the guided portion 24a serving as a fulcrum, and the urging force of the urging spring 42 acting in the frontward direction is imparted to the tray 14 through the slider 38 and the locking lever 46. The tray 14 is moved along with the slider 38 and the locking lever 46 with respect to the unit base 13 between the retracted position and the projected position.

When the tray 14 is moved with respect to the unit base 13, the bottom surface of the bottom wall 20 of the tray 14 slides on the sliding projections 19a of the sliding member 19 attached to the unit base 13, and the sliding projections 31a of the sliders 31 attached to the tray 14 slide on the top surface of the bottom section 16 of the unit base 13. Therefore, the tray 14 is smoothly moved with respect to the unit base 13 with a small frictional force generated.

When the tray 14 is moved along with the slider 38 and the locking lever 46 with respect to the unit base 13, the slider 38 is moved in the front-rear direction under the guidance of the support groove 35 of the support base 33. The locking lever 46 rotates about the connecting piece 48a serving as a fulcrum, and the roller 49 supported around the cam pin 47a moves in the cam groove 36.

The tray 14 is moved in a substantially curved trajectory with the first guided portion 24a and the second guided portion 25a each being guided to the first guide portion 16a and the second guide portion 16b, respectively. When the tray 14 is moved, the first guided portion 24a of the shaft plate 23 is rotated with respect to the locking lever 46.

When the tray 14 is moved with respect to the unit base 13, the operating projection 29c of the gear plate 29 slides on the bottom surface of the gear insertion groove 16c of the unit base 13. Therefore, a frictional force is generated between the operating projection 29c and the bottom surface of the gear insertion groove 16c to impart a rotational force to the gear unit 26 such that the gear unit is rotated in the direction opposite to the moving direction of the tray 14 about the second guided portion 25a.

When the tray 14 is moved from the retracted position toward the projected position, the above-described frictional force imparts a rotational force to the gear unit 26 in the direction of pressing the reduction gear 28 against the rack 18 (the direction R1 shown in FIGS. 6 and 7). Therefore, when the tray 14 is moved from the retracted position toward the projected position, the reduction gear 28 is engaged with the rack 18 with the gear unit 26 held in the engaged position, whereby the tray 14 is moved at a low speed because of the action of the reduction gear 28.

On the contrary, when the tray 14 is moved from the projected position toward the retracted position, the above-described frictional force imparts a rotational force to the gear unit 26 in the direction of disengaging the reduction gear 28 from the rack 18 (the direction R2 shown in FIGS. 6 and 7). Therefore, when the tray 14 is moved from the projected position toward the retracted position, the reduction gear 28 is disengaged from the rack 18 with the gear unit 26 held in the disengaged position, whereby the tray 14 is moved without any load applied by the reduction gear 28.

As shown in FIG. 3, a cable 50 and a socket 51 connected to one end of the cable 50 are disposed in the containing space 13b of the housing 2, and another end of the cable 50 is connected to the connection terminals 5a of the internal panel 4 through a connection circuit which is not shown. The socket 51 is a socket to be used for USB (universal serial bus) connection.

The cable 50 is inserted and supported in the cable supporting recess 17c of the tray 14, and the socket 51 is disposed in the tray 14.

<Operations of In-Vehicle Audio Apparatus>

Operations of the in-vehicle audio apparatus 1 will now be described (see FIGS. 10 to 22).

When the front panel 3 is in the closed position in which the panel closes the opening 2a of the housing 2, the tray 14 is in the retracted position.

First, a description will be made on states of various parts of the apparatus observed when the tray 14 is in the retracted position (see FIGS. 10 to 12).

Figure 10:
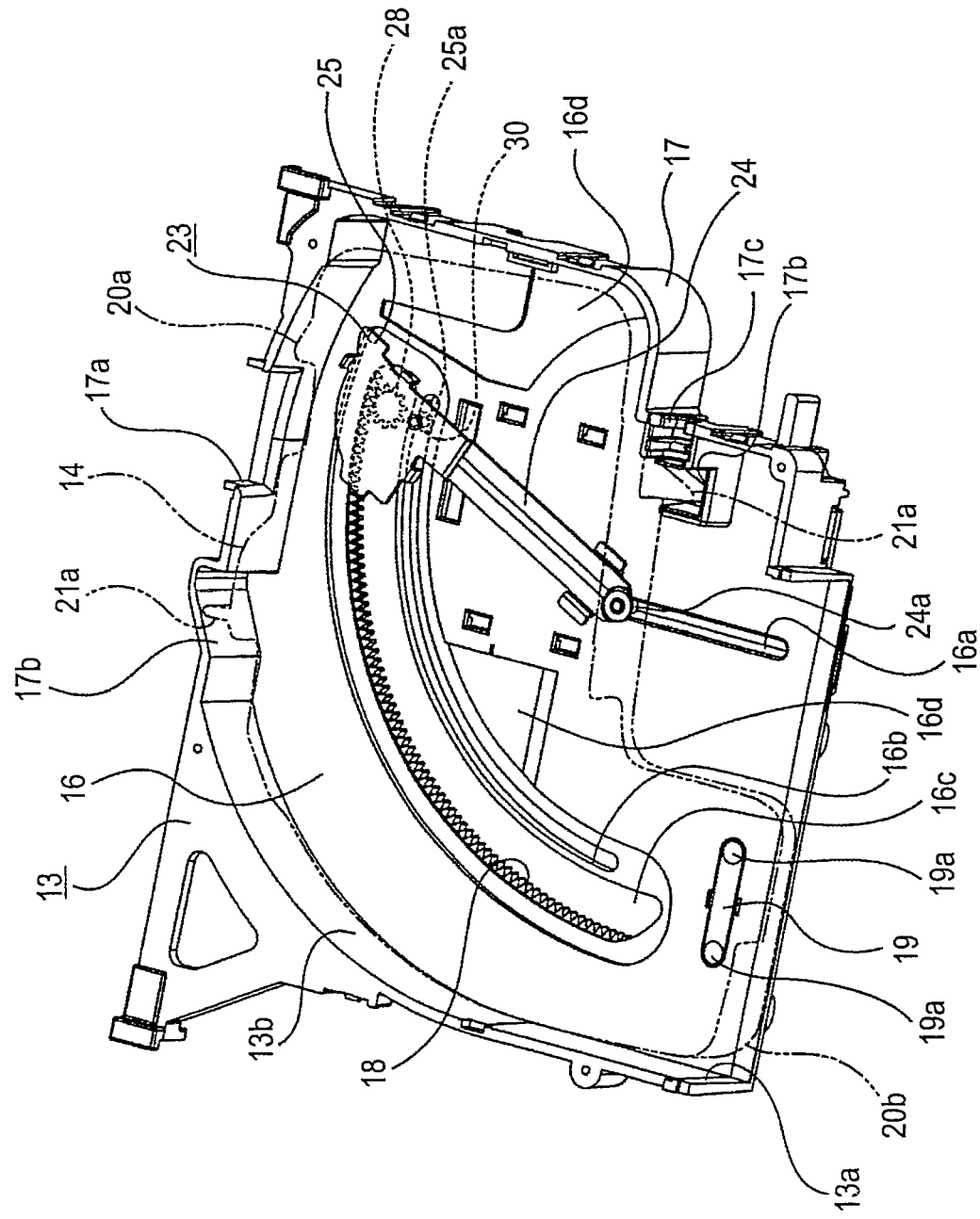
FIG. 10 is a perspective view of the in-vehicle audio apparatus showing an operation of the same, the apparatus being shown with the tray in the retracted position.

As shown in FIG. 10, in the retracted position, the tray 14 is situated such that the rectangular portion 20a is located don the rear side of the containing space 13b and such that the bend portion 20b is located on the front side of the containing space 13b. The rectangular portion 20a is in the state in which it is elongated in the transverse direction of the housing. In such a state, the anti-dust projections 21a of the tray 14 are inserted in the respective insertion recesses 17b of the unit base 13.

When the tray 14 is in the retracted position, the first guided portion 24a of the shaft/plate 23 is engaged with the first guide portion 16a in a position near the rear end of the first guide portion, and the second guided portion 25a is engaged with the second guide portion 16b in a position near an end (left end) of the second guide portion 16b. The reduction gear 28 is engaged with the rack 18 in a position near an end (left end) of the rack 18.

Figure 11:
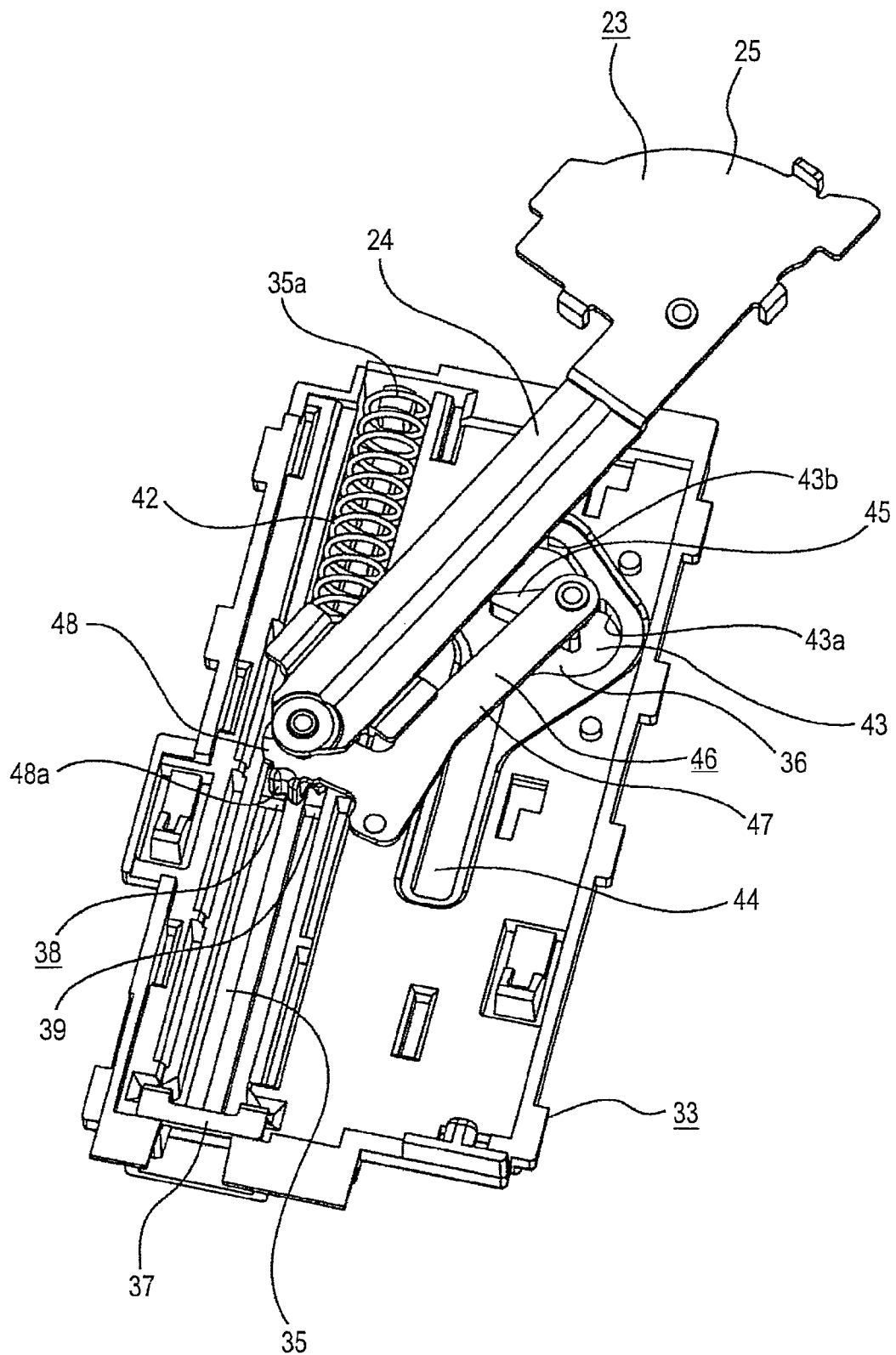
FIG. 11 is an enlarged perspective view of the driving unit and the shaft/plate in the state in which the tray is in the retracted position.
Figure 12:
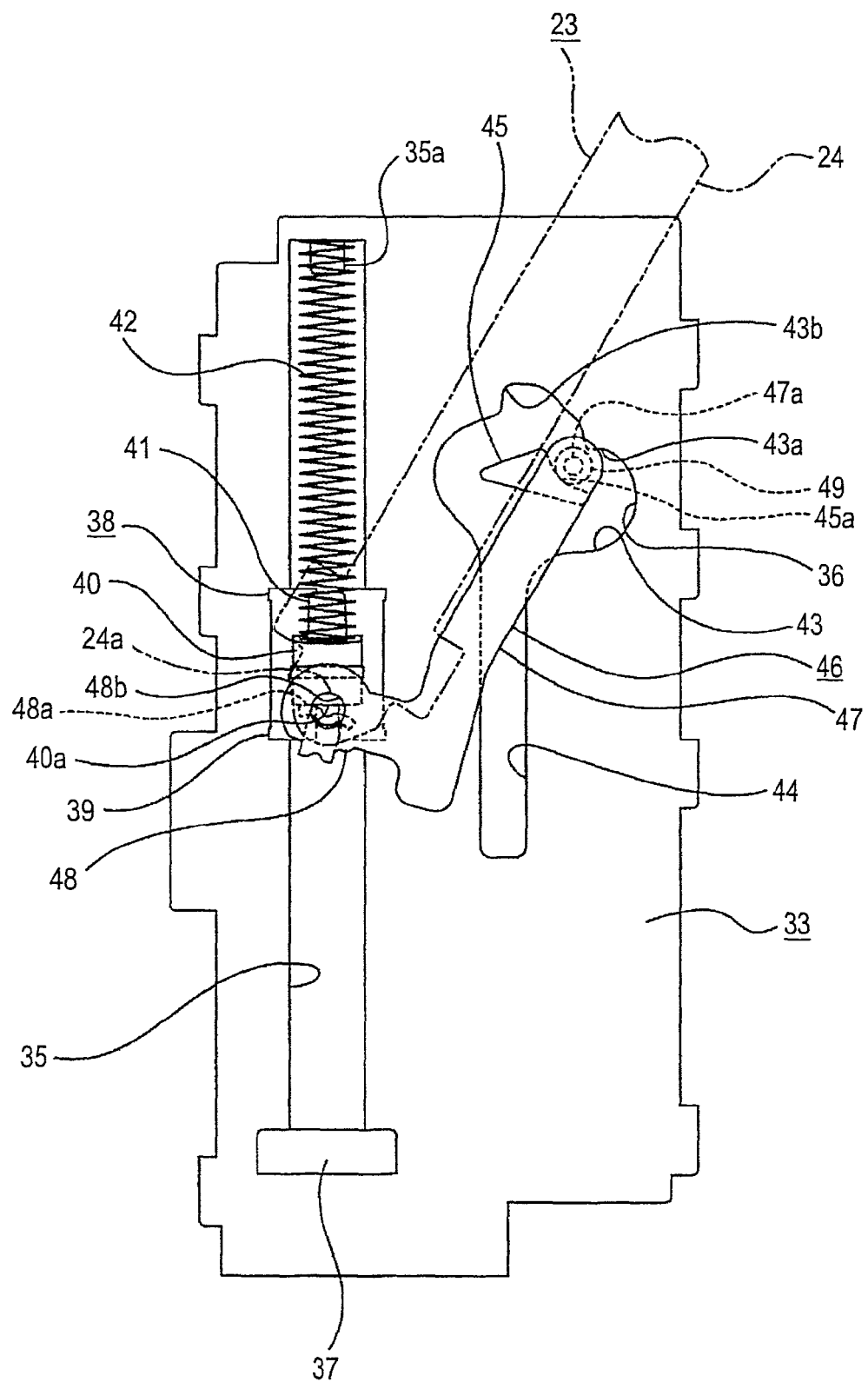
FIG. 12 is a schematic enlarged plan view of the driving unit and the shaft/plate in the state in which the tray is in the retracted position.
Figure 13:
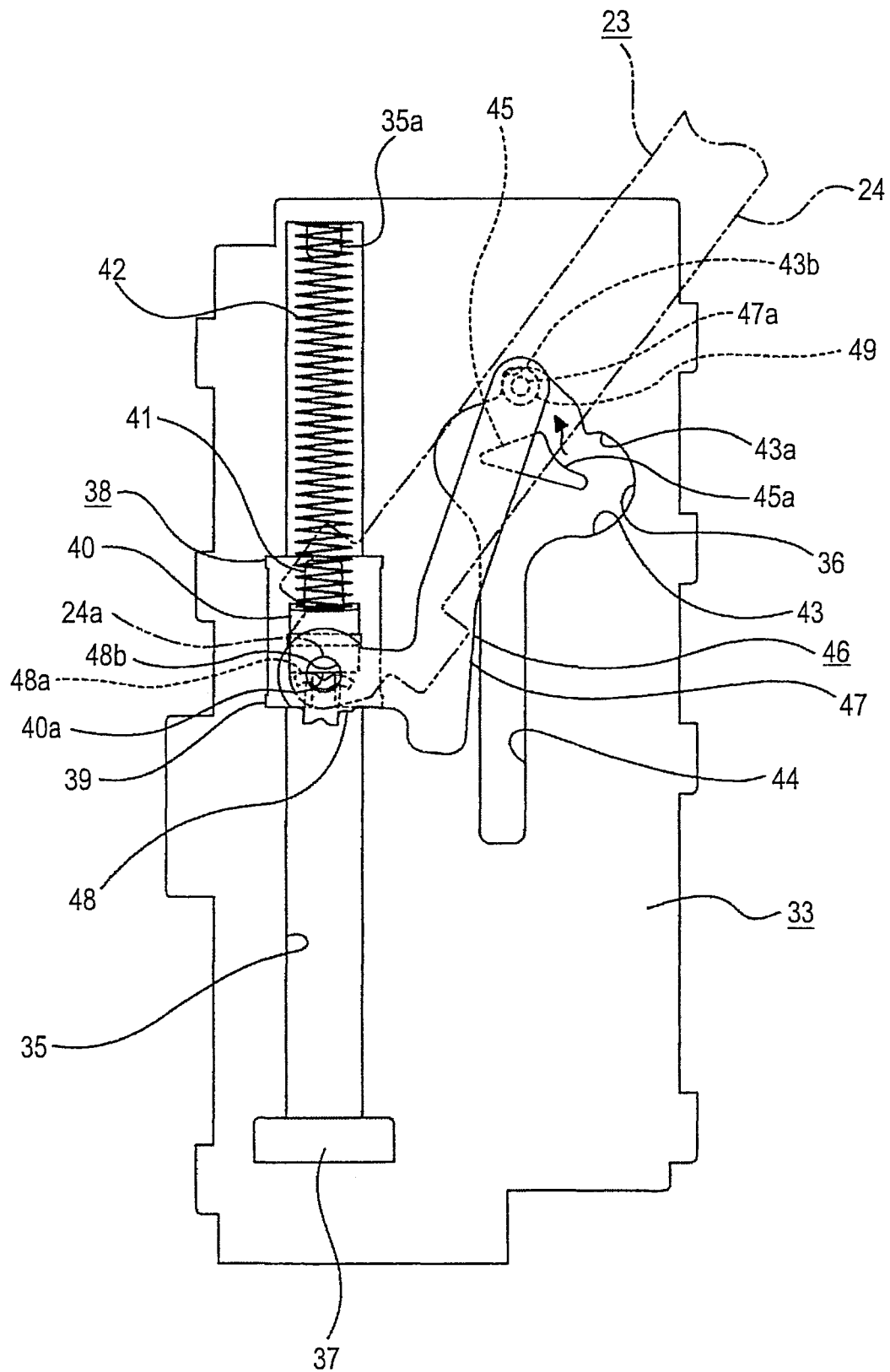
FIG. 13 is a schematic enlarged plan view of the driving unit and the shaft/plate in a state in which the tray is unlocked in the retracted position.

When the tray 14 is in the retracted position, the slider 38 is located substantially in the middle of the support groove 35 of the support base 33 when viewed on the front-rear direction (see FIGS. 11 and 12). At this time, the roller 49 supported around the cam pin 47a of the locking lever 46 is urged into engagement with the locking recess 45a formed on the cam engaging portion 45 of the support base 33 by the urging force of the urging spring 42. Thus, the tray 14 is locked in the retracted position.

When the front panel 3 has been rotated from the closed position in which the panel closes to opening 2a of the housing 2 to the open position in which the opening 2a is exposed, the tray 14 can be moved with respect to the unit base 13 from the retracted position toward the projected position.

When the front panel is moved from the closed position to the open position, the terminal portion 3b is disconnected from the connection terminals 5a of the internal panel 4.

When the urged portion 21c of the peripheral wall 21 is urged rearward with the front panel 3 rotated up to the open position, the tray 14 is moved with respect to the slider 13 in the direction opposite to the direction of moving the tray toward the projected position.

When the tray 14 is moved as thus described, the first guided portion 24a of the shaft/plate 23 is moved to the rear end of the first guide portion 16a, and the second guided portion 25a is moved to one end of the second guide portion 16b. At this time, the slider 38 connected with the shaft/plate 23 attached to the tray 14 is moved rearward against the urging force of the urging spring 42 (see FIG. 13).

As the slider 38 is moved rearward, the locking lever 46 is also moved rearward. Thus, the roller 49 is moved to the second regulating recess 43a of the annular portion 43 of the cam groove 36, whereby the roller 49 is disengaged from the locking recess 45a. Thus, the tray 14 is unlocked in the retracted position.

Figure 14:
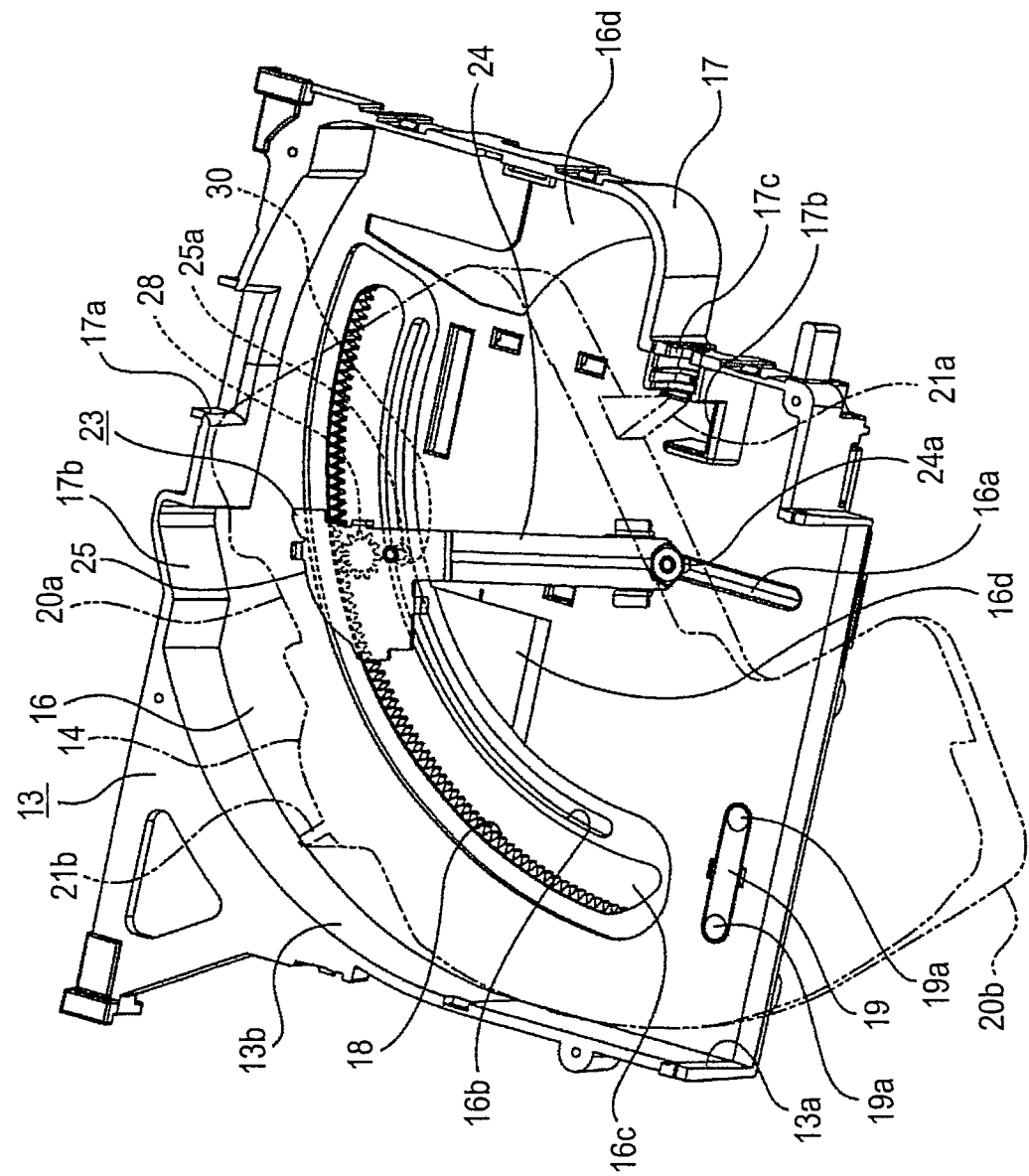
FIG. 14 is a perspective view of the driving unit and the shaft/plate in a state in which the tray is being moved from the retracted position toward the projected position.
Figure 15:
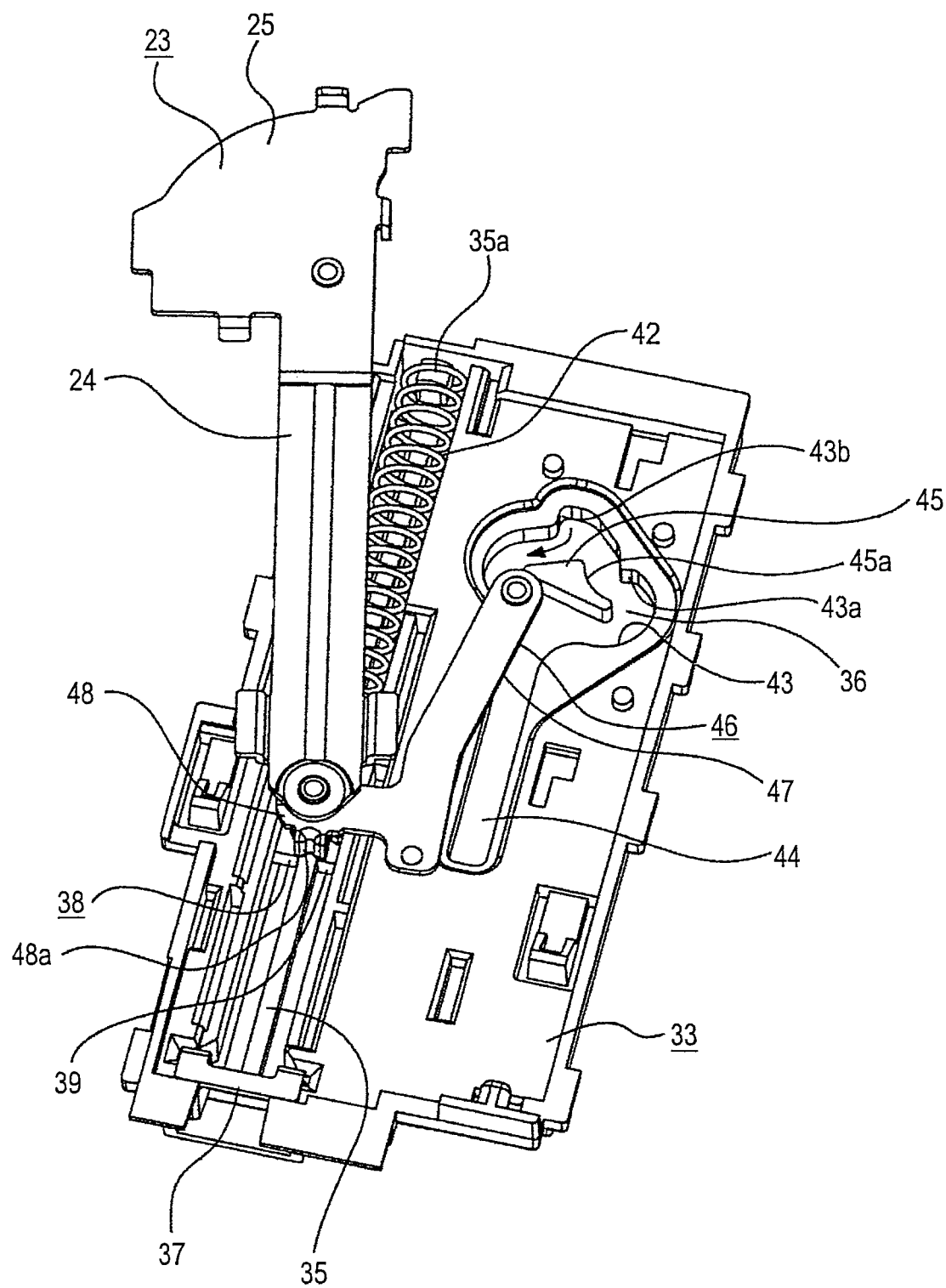
FIG. 15 is an enlarged perspective view of the driving unit and the shaft/plate in the state in which the tray is being moved from the retracted position toward the projected position.
Figure 16:
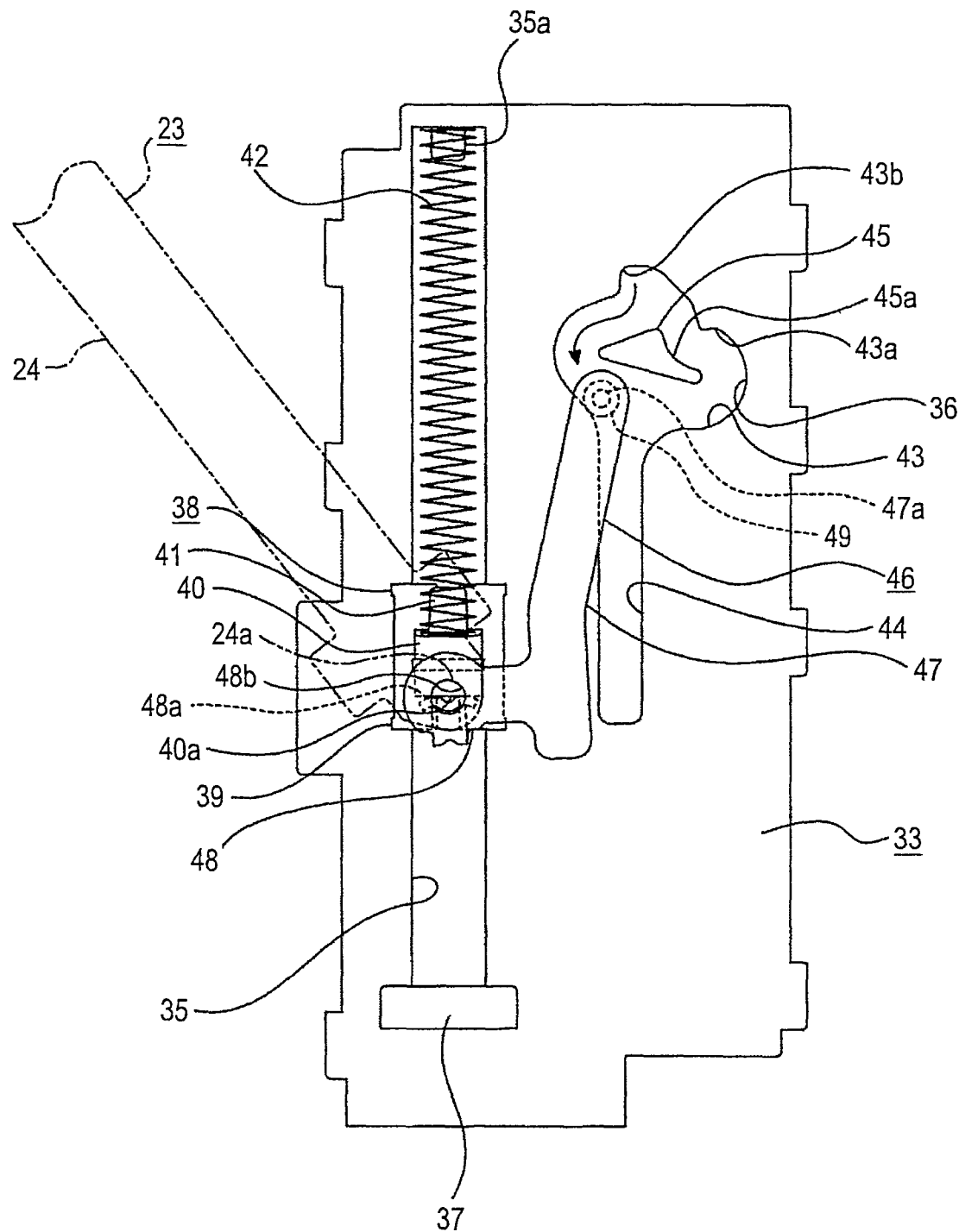
FIG. 16 is a schematic enlarged plan view of the driving unit and the shaft/plate in the state in which the tray is being moved from the retracted position toward the projected position.

When the rearward press on the urged portion 21c of the tray 14 is removed, the tray 14 is moved toward the projected position by the urging force of the urging spring 42 (see FIG. 14).

When the tray 14 is moved as thus described, the first guided portion 24a of the shaft/plate 23 is moved in the first guide portion 16a toward the front end thereof, and the second guided portion 25a is moved in the second guide portion 16b toward the other end (right end) thereof. At this time, the slider 38 is moved in the support groove 35 frontward by the urging force of the urging spring 42 (see FIGS. 15 and 16).

As the reduction gear 28 is rotated and advanced in engagement with the rack 18, the tray 14 is moved with respect to the unit base 13. Thus, the tray 14 is moved toward the projected position at a low speed.

As the slider 38 is moved frontward, the locking lever 46 is also moved frontward, whereby the roller 49 is moved from the annular portion 43 of the cam groove 36 toward the straight portion 44.

Figure 17:
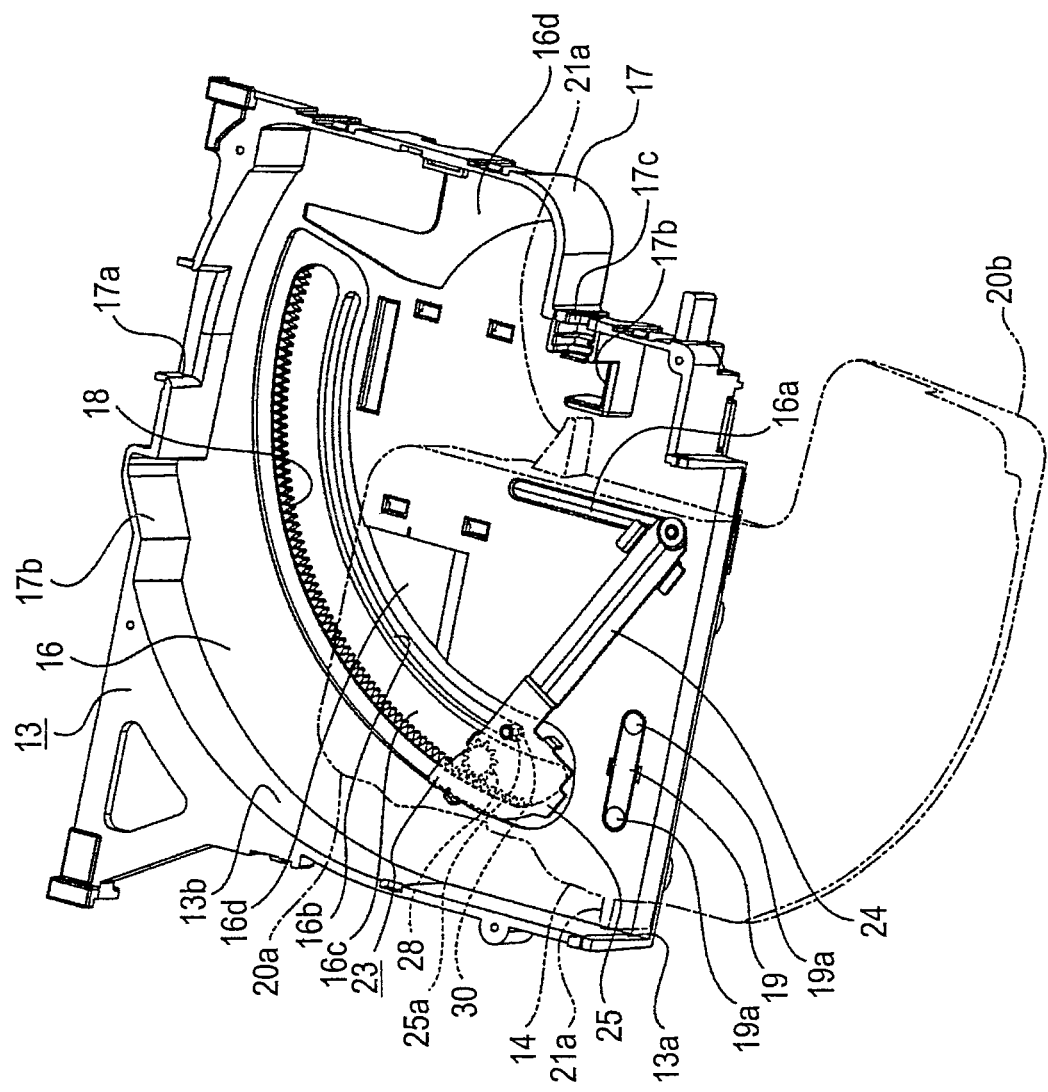
FIG. 17 is a perspective view of the tray taken when the tray has been moved to the projected position.
Figure 18:
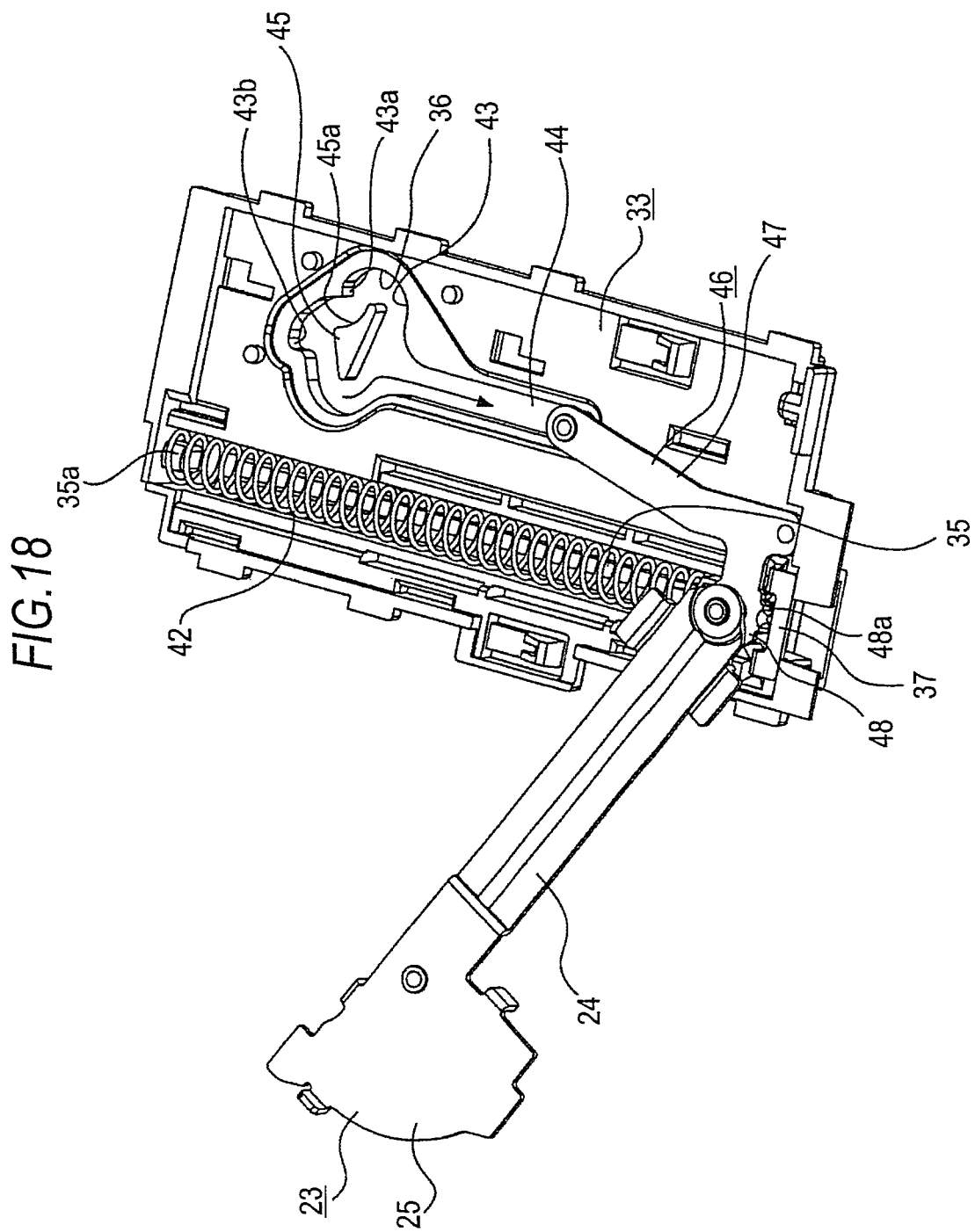
FIG. 18 is an enlarged perspective view of the driving unit and the shaft/plate taken when the tray has been moved to the projected position.
Figure 19:
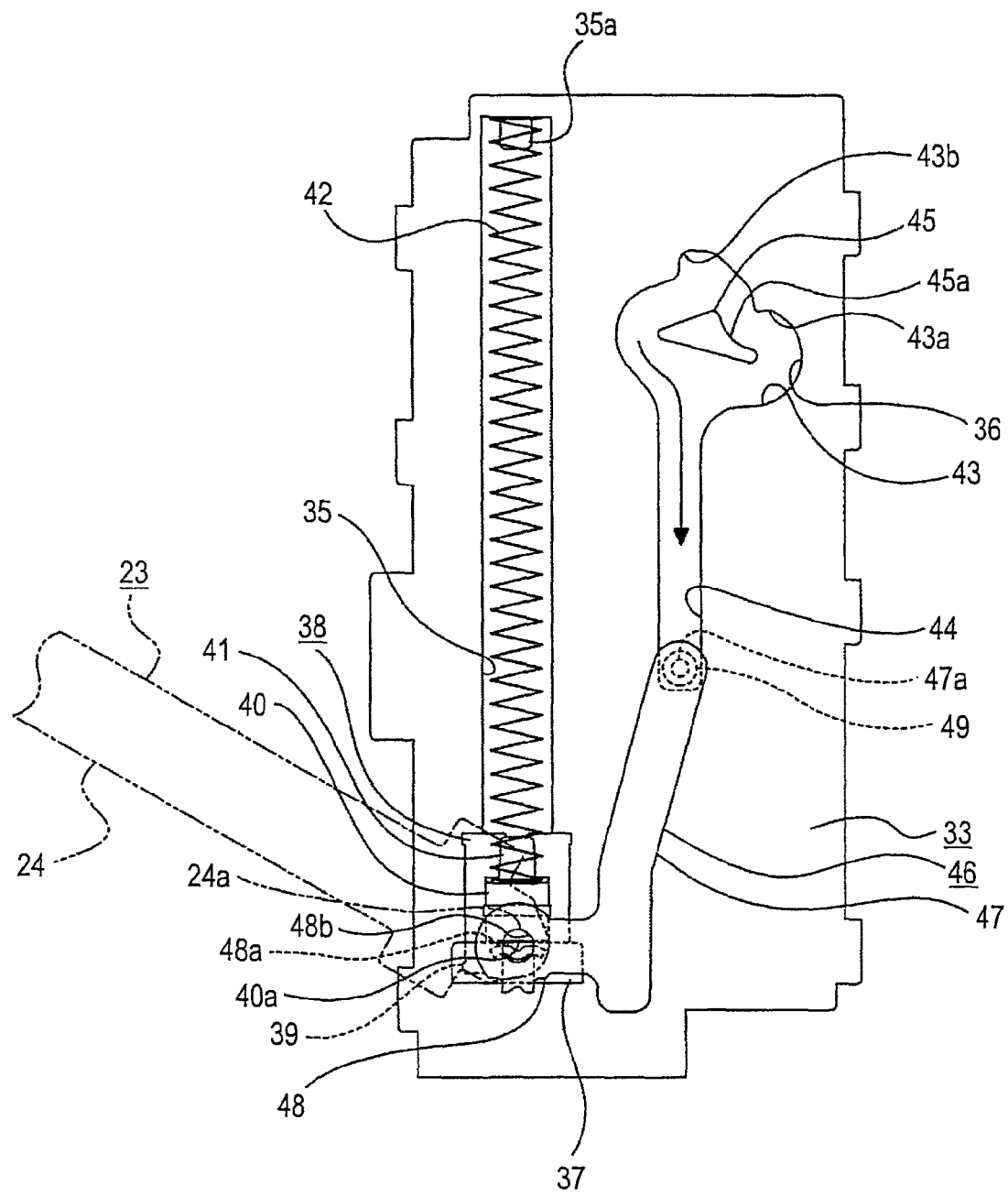
FIG. 19 is a schematic enlarged plan view of the driving unit and the shaft plate taken when the tray has been moved to the projected position.

The urging force of the urging spring 42 continues moving the tray 14 up to the projected position (see FIG. 17).

As the tray 14 is moved as this described, the first guided portion 24a of the shaft/plate 23 is moved to the front end of the first guide portion 16a, and the second guided portion 25a is moved to the other end of the second guide portion 16a. At this time, the slider 38 is moved in the support groove 35 frontward by the urging force of the urging spring 42, and the movement of the slider stopped when the front end of the supported portion 39 abuts on the stopper 37 (see FIGS. 18 and 19).

As the reduction gear 28 is rotated and advanced in engagement with the rack 18, the tray 14 is moved with respect to the unit base 13. Thus, the tray 14 is moved toward the projected position at a low speed.

As the slider 38 is moved frontward, the locking lever 46 is also moved frontward, and the roller 49 is moved up to the front end of the straight portion 44 of the cam groove 36.

The tray 14 is moved from the retracted position to the projected position in a substantially arcuate trajectory. Thus, when the tray 14 has been moved to the projected position, the rectangular portion 20a is elongated in the front-rear direction of the housing. At this time, the bend portion 20b projects frontward from the opening 2a of the housing 2 and the tray insertion hole 13a of the unit base 13 (FIG. 17).

Figure 20:
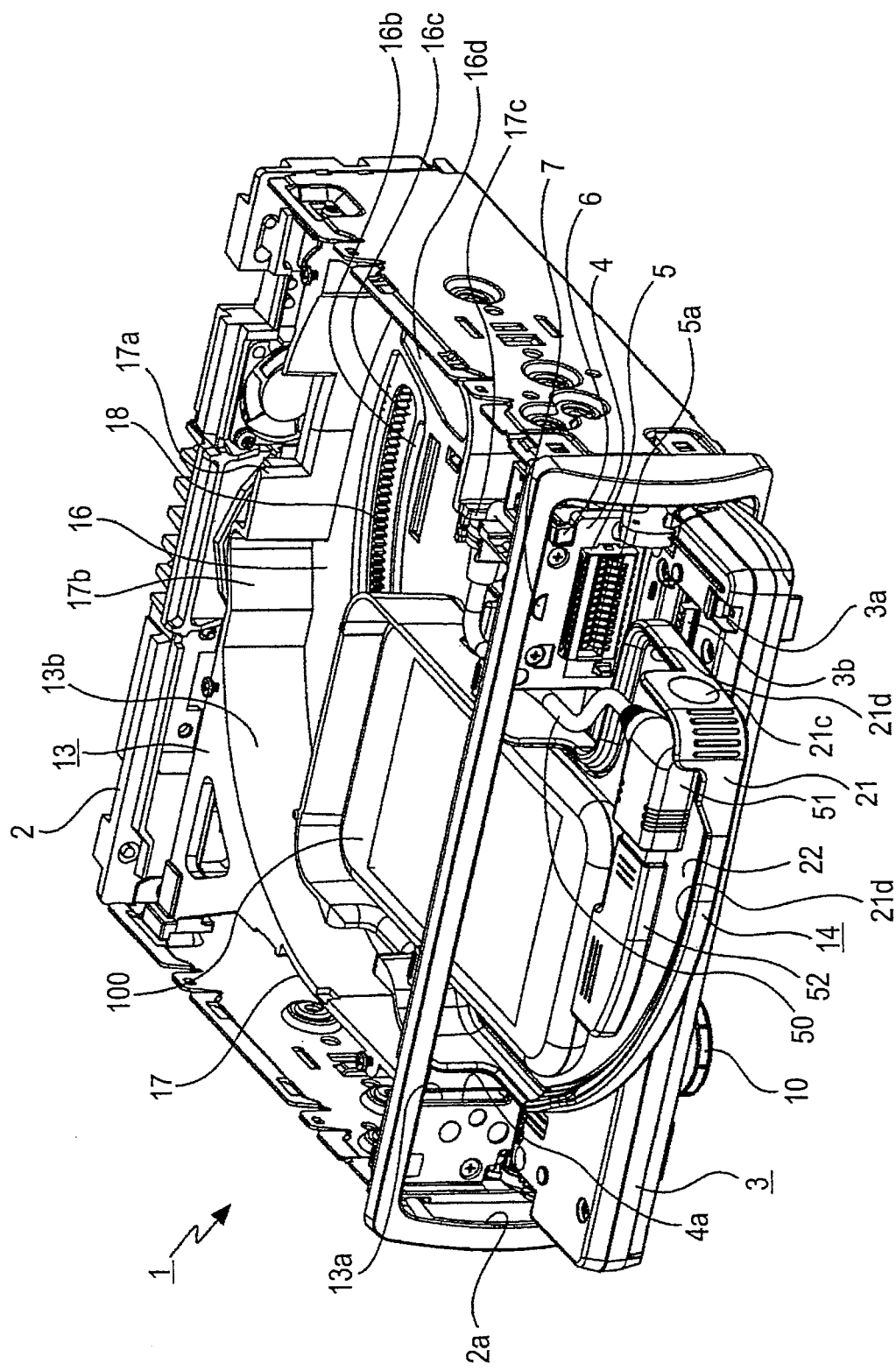
FIG. 20 is a perspective view of the in-vehicle audio apparatus taken with a top part of a housing thereof removed to shown a music player placed on the tray in the projected position.
Figure 21:
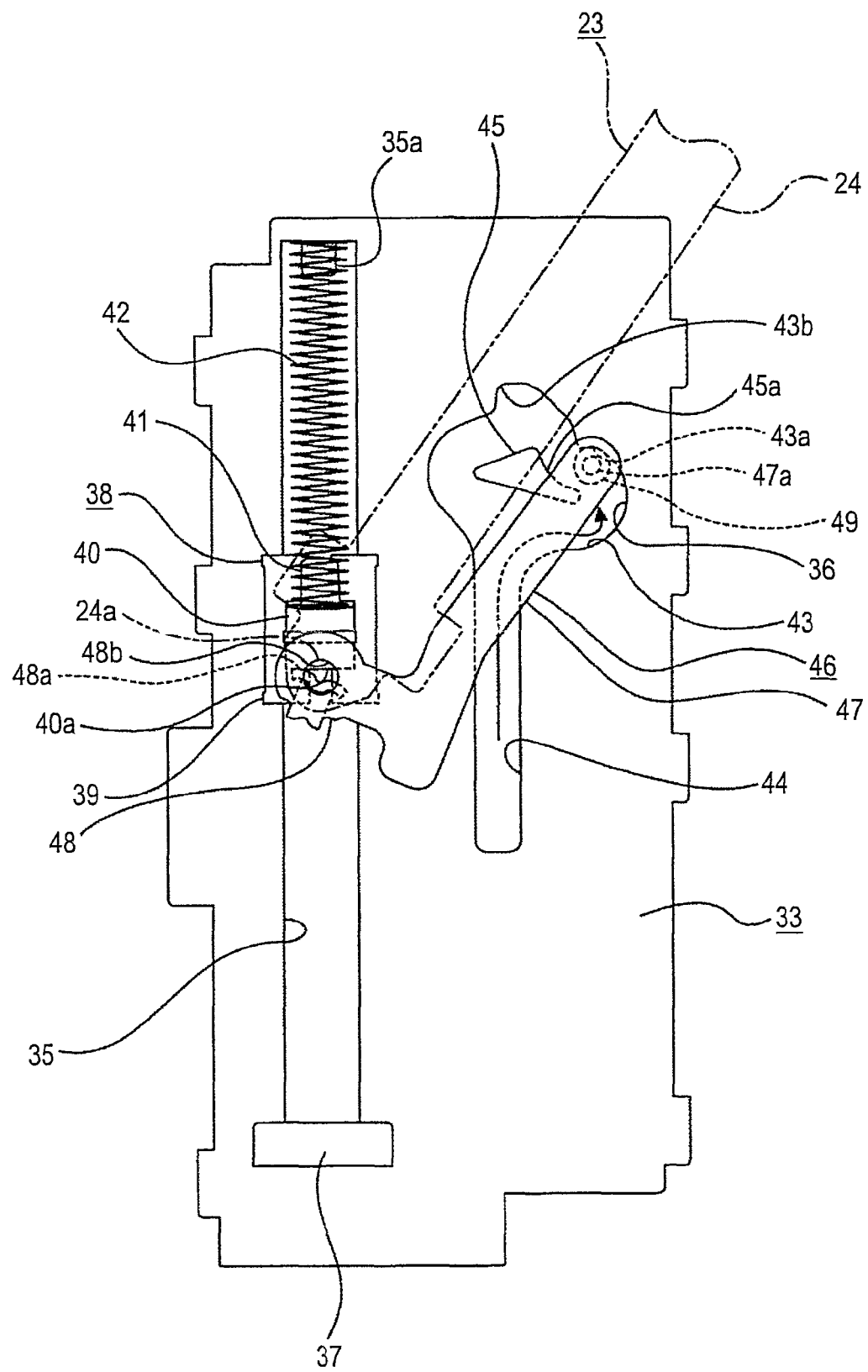
FIG. 21 is a schematic enlarged plan view of the driving unit and the shaft/plate taken immediately before the tray is locked in the retracted position after being moved from the projected position.

In the projected position, the music player 100 is placed on the tray 14 (see FIG. 20). The music player 100 is placed on the rectangular portion 20a in accordance with the direction in which the rectangular portion 20a is set. That is, the music player 100 is placed such that it is elongated in the front-rear direction of the housing. At this time, the socket 51 is connected to a connector (not shown) of the music player 100 through a conversion adaptor 52. The music player 100 is connected to the connector section 5 provided on the internal panel 4 through the conversion adaptor 52, the socket 51, and the cable 50.

When the urged portion 21c of the tray 14 is subsequently manually urged in a lateral direction, the tray 14 is moved toward the retracted position against the urging force of the urging spring 42.

As the tray 14 is moved as thus described, the first guided portion 24a of the shaft/plate 23 is moved to a position in the guide portion 16a near the rear end thereof, and the second guided portion 25a is moved to a position in the guide portion 16b near one end thereof. At this time, the slider 38 is moved rearward in the support groove 35 against the urging force of the urging spring 42 (see FIG. 21).

Since the gear unit 26 of the tray 14 has been rotated to the disengaged position as described above, the tray 14 is moved with respect to the unit base 13 toward the retracted position with the reduction gear 28 disengaged from the rack 18.

Since the tray 14 is therefore moved toward the retracted position with no load imparted from the reduction gear 28, the tray 14 can be moved toward the retracted position smoothly at a high speed.

The gear plate 29 is provided with the operating projection 29c to allow the reduction gear 28 to be engaged and disengaged with and from the rack 18 utilizing a rotational force generated at the gear unit 26 by a frictional force generated between the operating projection 29c and the bottom surface of the gear insertion groove 16c of the unit base 13.

Thus, a simple mechanism is used to engage and disengage the reduction gear 28 with and from the rack 18. Therefore, when the tray 14 is moved, the operating speed can be controlled and the load can be kept small with a simple mechanism.

As the slider 38 is moved rearward, the locking lever 46 is also moved rearward, and the roller 49 is moved from the straight portion 44 of the cam groove 36 to the first regulating recess 43a of the annular portion 43.

When the roller 49 has been moved to the first regulating recess 43a of the cam groove 36, the movement of the locking lever 46, the slider 38, the shaft/plate 23, and the tray 14 is temporarily stopped.

When the manual press on the tray 14 is thereafter removed, the tray 14 is moved toward the projected position again by the urging force of the urging spring 42. At this time, the locking lever 46 is moved frontward as a result of the frontward movement of the slider 38, and the roller 49 is urged by the urging force of the urging spring 42 into engagement with the locking recess 45a formed on the cam engaging portion 45 of the support base 33. Thus, the movement of the tray 14 is stopped, and the tray 14 is locked in the retracted position again (see FIG. 12).

Figure 22:
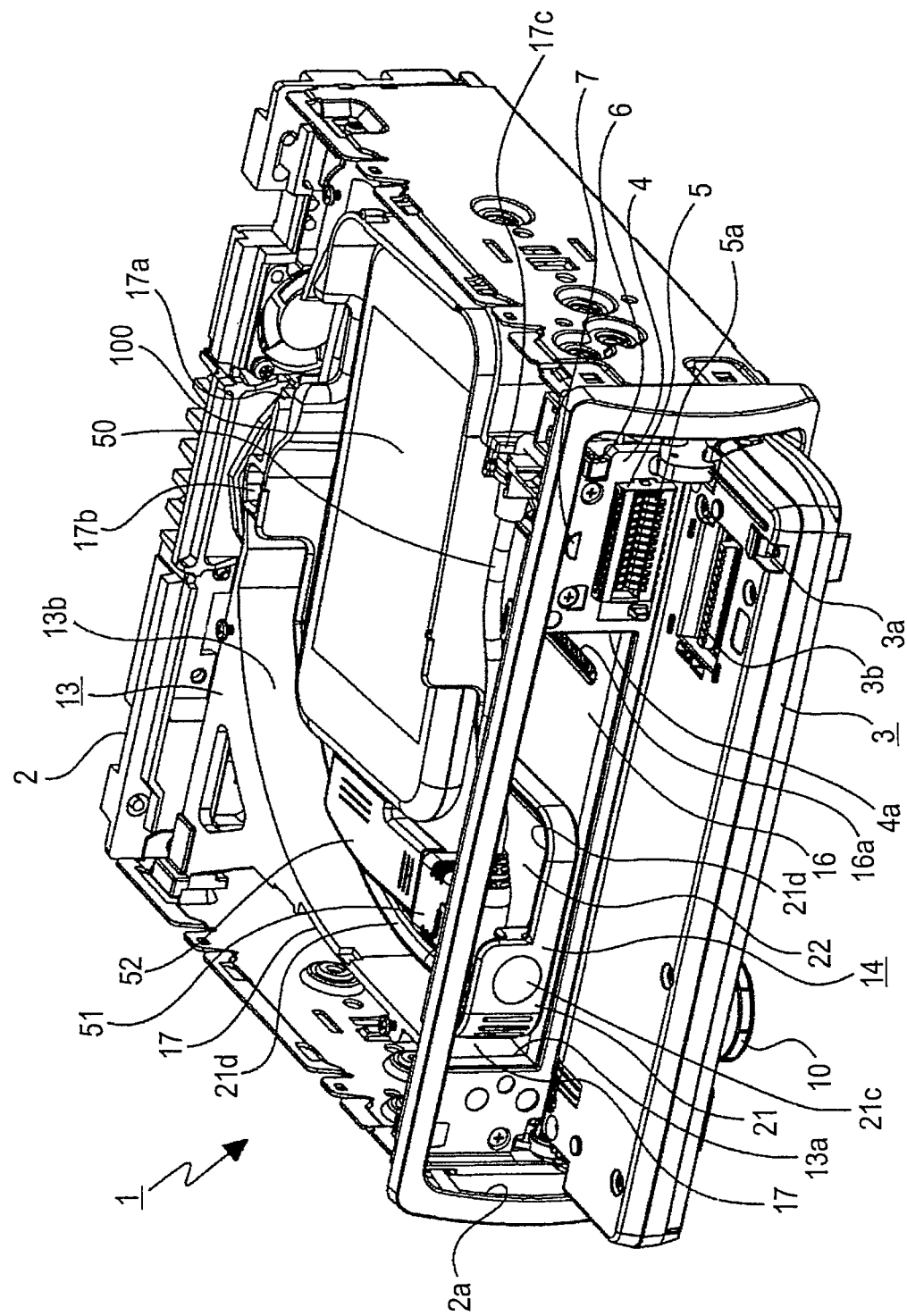
FIG. 22 is a perspective view of the in-vehicle audio apparatus taken with the top part of the housing removed to show the tray which has been moved to the retracted position.

When the tray 14 has been moved to the retracted position, as shown in FIG. 22, the tray 14 is contained in the housing such that a part of the rectangular portion 20a is located directly behind the connector section 5 of the internal panel 4 and such that the music player 100 is disposed in the containing space 13b in the transversally elongate state.

When the tray 14 has been moved to the retracted position as thus described, the front panel 3 is rotated from the open position to the closed position. Thus, the opening 2a of the housing 2 is closed, and the terminal portion 3b and the connection terminals 5a of the internal panel 4 are connected. When the terminal portion 3b of the front panel 3 is connected with the connection terminals 5a, the display of the state of the music player 100 is enabled, and the operating portions 9 are enabled for operating the music player 100.

Thus, the user can reproduce music recorded in the music player 100 from outside by operating the operating portions 9 or using a remote controller.

Figure 23:
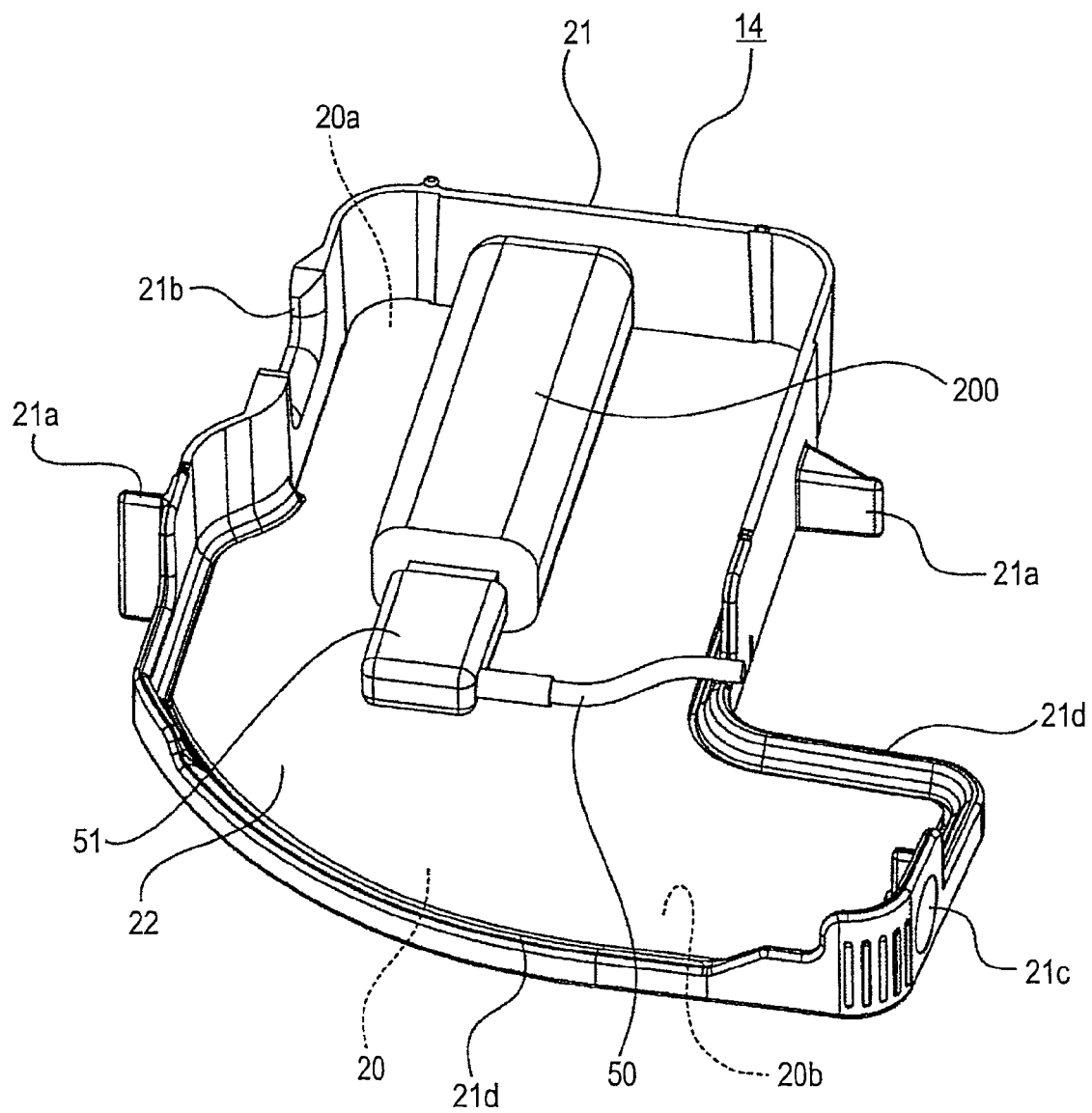
FIG. 23 is a perspective view of and the shaft/plate taken immediately before the tray is locked in the retracted position after being moved from the projected position.

Although the socket 51 is connected to the music player 100 using the conversion adaptor 52 in the above-described example, a music player 200 of a different type to which the socket 51 can be connected without the conversion adaptor 52 may alternatively be used. In this case, the socket 51 is connected to the music player 200 without using the conversion adaptor 52 as shown in FIG. 23.

<Brief>

As described above, in the in-vehicle audio apparatus 1, the tray 14 is moved with respect to the unit base 13 such that the tray 14 is set with respect to the unit base 13 in orientations substantially 90 deg different from each other in the retracted position and the projected position.

Therefore, the music players 100 and 200 are set in orientations substantially 90 deg different from each other in the projected position and the retracted position. Thus, the space in the apparatus can be efficiently used to achieve compactness.

Only a part of the tray 14 of the in-vehicle audio apparatus 1 is projected frontward from the unit base 13 in the projected position. Therefore, the tray 14 can be set in the projected position with high stability.

Further, in the in-vehicle audio apparatus 1, the unit base 13 is formed with the first guide portion 16a having a straight shape and the second guide portion 16b having a curved shape, and the tray 14 is provided with the first guided portion 24a guided by the first guide portion 16a and the second guided portion 25a guided by the second guide portion 16b.

Since the tray 14 is therefore moved in a trajectory including both curved and straight trajectories, the trajectory of the movement of the tray 14 may be designed as desired depending on the shapes and positions of members such as the unit base 13. Thus, spaces can be optimally utilized to achieve higher compactness. Since the tray 14 moves in a trajectory including a straight trajectory, when the tray has been moved to the projected position, the tray 14 can be projected frontward in a greater amount from the opening 2a of the unit base 13. Thus, the music players 100 and 200 can be easily placed on the tray 14.

Further, the music players 100 and 200 are placed on the tray 14 in the projected position such that the music player is elongated in the front-rear direction of the housing. Therefore, when the tray 14 is in the projected position, a space can be easily formed beside the tray 14. It is therefore possible to dispose a required component such as the connector section 5 beside the tray 14 while preventing any increase in the size of the in-vehicle audio apparatus 1. Thus, a connecting structure of the terminal portion 3b of the front panel 3 and the connection terminals of the internal panel 4 can be provided at an optimal position with the in-vehicle audio apparatus 1 being prevented from increasing in size, and the apparatus can be designed with improved flexibility and manufactured at a low cost.

In addition, since the tray 14 of the in-vehicle audio apparatus 1 is moved from the retracted position to the projected position utilizing the urging force of the urging spring 42, a simple mechanism can be used.

Furthermore, the locking lever 46 is urged frontward by the urging force of the urging spring 42, whereby the roller 49 is pressed against the locking recess 45a of the cam engaging portion 45 to lock the tray 14 in the retracted position.

Therefore, the urging spring 42 has two functions, i.e., the function of imparting a force to the tray 14 to move the tray toward the projected position and acting on the locking lever 46 to lock the tray 14 in the retracted position. Thus, the number of components can be kept small, and the apparatus can be manufactured at a low cost.

In the in-vehicle audio apparatus 1, the tray 14 is unlocked in the retracted position and thereafter moved toward the projected position by urging the urged portion 21c of the tray 14 rearward and thereafter removing the press.

Thus, the operation to be performed by the user to move the tray 14 from the retracted position toward the projected position is simple, and improved user friendliness can therefore be achieved.

In the above-described embodiment, the tray 14 is moved from the retracted position to the projected position utilizing the urging force of the urging spring 42. For example, the tray 14 may alternatively be moved between the retracted position and the projected position by the driving force of a motor provided for moving the tray 14 instead of the urging spring 42.

In the in-vehicle audio apparatus 1, when the tray is in the retracted position, the music player 100 or 200 is contained in the space behind the connector section 5 such that the player is elongated in the transverse direction of the apparatus. Thus, the size of the in-vehicle audio apparatus 1 in the front-rear direction (depth direction) thereof can be kept small.

The specific shapes and structures of the respective parts exemplified in the embodiments described above are just examples embodying the invention and the technical scope of the invention is no limited to them in any way.

It should be understood by those skilled in the art that various modifications, combinations, sub-combinations and alterations may occur depending on design requirements and other factors insofar as they are within the scope of the appended claims or the equivalents thereof.

What is claimed is:

1. An in-vehicle audio apparatus comprising:
a housing having an opening at least on one side thereof;
a unit base disposed in the housing and having an internal space formed as a containing space;
a tray movable parallel to a plane normal to the opening between a retracted position in which the tray is contained in the containing space and a projected position in which a music player formed in a substantially rectangular shape can be placed on the tray and in which a part of the tray is projected from the base unit;
a front panel rotatably supported on the housing for exposing and closing the opening of the housing;
a connector section provided inside the housing and in a position on a side of the housing, the connector section having a connection terminal; and
a terminal portion connected to the connection terminal of the connector section when the opening of the housing is closed by the front panel,
wherein the tray is moved parallel to the plane with respect to the unit base such that the orientations of the tray with respect to the unit base in the retracted and projected positions are substantially 90 deg different from each other, and
wherein the tray is moved parallel to the plane from the retracted position to the projected position in a substantially arcuate trajectory, and
wherein the music player is placed on the tray in the projected position and located beside the connector section such that the music player is elongated in the front-rear direction of the apparatus.

2. An in-vehicle audio apparatus comprising:
a housing having an opening at least on one side thereof;
a unit base disposed in the housing and having an internal space formed as a containing space;
a tray movable between a retracted position in which the tray is contained in the containing space and a projected position in which a music player formed in a substantially rectangular shape can be placed on the tray and in which a part of the tray is projected from the base unit
a front panel rotatably supported on the housing for exposing and closing the opening of the housing;
a connector section provided inside the housing and in a position on a side of the housing, the connector section having a connection terminal; and
a terminal portion connected to the connection terminal of the connector section when the opening of the housing is closed by the front panel,
wherein the tray is moved with respect to the unit base such that the orientations of the tray with respect to the unit base in the retracted and projected positions are substantially 90 deg different from each other,
wherein the tray is moved from the retracted position to the projected position in a substantially arcuate trajectory, and
wherein the music player is placed on the tray in the projected position and located beside the connector section such that the music player is elongated in the front-rear direction of the apparatus.

3. An in-vehicle audio apparatus comprising:

a housing having an internal space formed as a containing space;

a tray movable parallel to a plane parallel to the front-rear direction of the apparatus between a retracted position in which the tray is contained in the containing space and a projected position in which a music player formed in a substantially rectangular shape can be placed on the tray and in which a part of the tray is projected from the containing space;

a front panel rotatably supported on the housing for exposing and closing an opening of the housing;

a connector section provided inside the housing and in a position on a side of the housing, the connector section having a connection terminal; and a terminal portion connected to the connection terminal of the connector section when the opening of the housing is closed by the front panel, wherein the tray is moved parallel to the plane with respect to the housing such that the orientations of the tray with respect to the housing in the retracted and projected positions are substantially 90 deg different from each other, wherein the tray is moved parallel to the plane from the retracted position to the projected position in a substantially arcuate trajectory, and wherein the music player is placed on the tray in the projected position and located beside the connector section such that the music player is elongated in the front-rear direction of the apparatus.

4. An in-vehicle audio apparatus according to claim 2, further comprising:

a locking lever locking the tray in the retracted position; and an urging spring imparting a force to the tray to move it from the retracted position toward the projected position, wherein the tray is moved from the retracted position toward the projected position by the urging force of the urging spring when the tray is unlocked or released from the locking lever in the retracted position.

5. An in-vehicle audio apparatus according to claim 2, wherein the music player is placed on the tray such that it is elongated in the front-rear direction of the tray when the tray is in the projected position.

* * * * *